(12) United States Patent
Minowa et al.

(10) Patent No.: US 10,780,729 B2
(45) Date of Patent: Sep. 22, 2020

(54) INFORMATION RECORDING MEDIUM AND INDIVIDUAL CERTIFICATE MEDIUM

(71) Applicant: TOPPAN PRINTING CO., LTD., Tokyo (JP)

(72) Inventors: Kazuyo Minowa, Tokyo (JP); Naoki Minamikawa, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/684,062

(22) Filed: Nov. 14, 2019

(65) Prior Publication Data
US 2020/0079132 A1 Mar. 12, 2020

Related U.S. Application Data

(63) Continuation of application No. PCT/JP2018/019708, filed on May 22, 2018.

(30) Foreign Application Priority Data

May 22, 2017 (JP) ................. 2017-100848

(51) Int. Cl.
*B42D 25/435* (2014.01)
*B42D 25/328* (2014.01)
(Continued)

(52) U.S. Cl.
CPC ......... *B42D 25/328* (2014.10); *B42D 25/435* (2014.10); *G02B 5/18* (2013.01); *G09F 19/14* (2013.01)

(58) Field of Classification Search
CPC .................................................. B42D 25/435
See application file for complete search history.

(56) References Cited

U.S. PATENT DOCUMENTS 6,082,778 A * 7/2000 Solmsdorf ........... B42D 25/435
283/107
8,238,027 B2 8/2012 Tompkin et al.
(Continued)

FOREIGN PATENT DOCUMENTS

EP 2 157 458 A 2/2010
JP H07-98752 A 4/1995
(Continued)

OTHER PUBLICATIONS

International Searching Authority, "International Search Report," in connection with International Patent Application No. PCT/JP2018/019708, dated Aug. 21, 2018.
(Continued)

*Primary Examiner* — Kyle R Grabowski
(74) *Attorney, Agent, or Firm* — Foley & Lardner LLP

(57) ABSTRACT

An individual certificate medium includes an optical security patch in which a relief layer and a metal layer include a first area and a second area. The first area includes an altered region and a portion of the relief layer overlapping with the altered region as viewed in the thickness direction of a recording layer. The second area includes a non-altered region and another portion of the relief layer overlapping with the non-altered region as viewed in the thickness direction. As viewed in the thickness direction, the first area transmits light incident thereon, while the second area absorbs light incident thereon to hide a recording region. In a direction intersecting the thickness direction, the first and second areas cause light incident on the optical security patch to emerge as diffracted light.

8 Claims, 9 Drawing Sheets

(51) Int. Cl.
*G02B 5/18* (2006.01)
*G09F 19/14* (2006.01)

(56) References Cited

U.S. PATENT DOCUMENTS

| | | | |
|---|---|---|---|
| 8,367,277 B2 | 2/2013 | Brehm et al. | |
| 10,112,432 B2 | 10/2018 | Holmes | |
| 10,259,252 B2 | 4/2019 | Attner et al. | |
| 2006/0145468 A1* | 7/2006 | Plaschka | B42D 25/435 283/72 |
| 2007/0087173 A1 | 4/2007 | Endres et al. | |
| 2010/0080938 A1 | 4/2010 | Toda et al. | |
| 2010/0290039 A1 | 11/2010 | Endres et al. | |
| 2011/0239886 A1 | 10/2011 | Holmes | |
| 2016/0121641 A1 | 5/2016 | Toda et al. | |
| 2017/0313121 A1* | 11/2017 | Schilling | B42D 25/47 |

FOREIGN PATENT DOCUMENTS

| | | |
|---|---|---|
| JP | 2007-531906 A | 11/2007 |
| JP | 2008-105226 A | 5/2008 |
| JP | 2010-500186 A | 1/2010 |
| JP | 2010-518432 A | 5/2010 |
| JP | 2011-123365 A | 6/2011 |
| JP | 2012-507039 A | 3/2012 |
| JP | 2013-520336 A | 6/2013 |
| WO | WO-97/19820 A | 6/1997 |
| WO | WO-2005/048182 A | 5/2005 |
| WO | WO-2012/050223 A1 | 4/2012 |
| WO | WO-2017/010548 A1 | 1/2017 |
| WO | WO-2017/191755 A1 | 11/2017 |
| WO | WO-2017/200030 A1 | 11/2017 |

OTHER PUBLICATIONS

International Searching Authority, "Written Opinion," in connection with International Patent Application No. PCT/JP2018/019708, dated Aug. 21, 2018.
Extended European Search Report dated May 14, 2020 for corresponding European Patent Application No. 18806288.9.

* cited by examiner

INFORMATION RECORDING MEDIUM AND INDIVIDUAL CERTIFICATE MEDIUM

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2018/019708, filed on May 22, 2018, which is based upon and claims the benefit of priority to Japanese Patent Application No. 2017-100848, filed on May 22, 2017; the disclosures of which are all incorporated herein by reference in their entireties.

TECHNICAL FIELD

The present invention relates to an information recording medium and an individual certificate medium.

BACKGROUND ART

There are known individual certificate media which include a laser carbonizable layer and a hologram layer and are used for cards and passports or the like. The laser carbonizable layer has a characteristic of changing its color to black when it absorbs a laser beam having a specific wavelength. A facial image or the like is written into the laser carbonizable layer as information belonging to a particular individual. The hologram layer is configured to display an image formed by diffracted light, depending on change of refractive index or asperities of the hologram layer (e.g., refer to PTL 1).

CITATION LIST

[Patent Literature] [PTL1] WO-2012/050223-A1

SUMMARY OF THE INVENTION

Technical Problem

Such individual certificate media are desired to produce enhanced visual effects.

The circumstances set forth above for the information recording media used as individual certificate media are common to information recording media used for games or the like which also include portions that have been carbonized by application of a laser beam and portions configured to cause diffracted light to emerge, although the usage is different from personal authentication.

The present invention aims to provide an information recording medium and an individual certificate medium which produces enhanced visual effects.

Solution to Problem

An information recording medium for solving the problem set forth above includes a recording layer that includes a non-recording region characteristic of being carbonizable by application of a laser beam and having optical transparency, and a recording region enclosed by the non-recording region and presenting predetermined information by being carbonized by application of the laser beam; a relief layer that includes a plurality of two-dimensionally arrayed convexities in a region which overlaps with the entirety of the recording region and occupies a region larger than the recording region as viewed in a thickness direction of the recording layer, the convexities being arrayed at a pitch of 190 nm or more and 580 nm or less and having optical transparency; and a metal layer that overlaps with the entirety of the recording region and covers the plurality of convexities in the region as viewed in the thickness direction, the metal layer mainly containing metal, the metal layer including an altered region overlapping with the entirety of the recording region as viewed in the thickness direction and having optical transparency, and a non-altered region that is a portion other than the altered region. The relief layer and the metal layer configure an optical security patch that includes a first area and a second area. The first area includes the altered region and a portion of the relief layer, the portion being aligned with the altered region as viewed in the thickness direction. The second area includes the non-altered region and another portion of the relief layer, the portion being aligned with the non-altered region as viewed in the thickness direction. The first area transmits light incident on the first area and the second area absorbs light incident on the second area to hide the recording region as viewed in the thickness direction. The first area and the second area cause light incident on the optical security patch to emerge as diffracted light in a direction intersecting the thickness direction.

An individual certificate medium for improving or even solving the problem set forth above includes the information recording medium described above, and the information recording medium presents personal information belonging to a particular individual.

According to the configuration described above, when the information recording medium is observed in the thickness direction of the recording layer, the recording region included in the recording layer is hidden by the optical security patch and thus the recording region is unlikely to be observed by the observer. In contrast, when the information recording medium is observed in a direction intersecting the thickness direction of the recording layer, the diffracted light emerging from the optical security patch enables the observer to observe the recording region due to the contrast between the color of the diffracted light and the color of the recording region. Thus, according to the information recording medium, the image presented by the information recording medium can be changed when the direction of observing the information recording medium is changed. Consequently, visual effects of the information recording medium are increased.

An individual certificate medium for solving the problem set forth above includes the information recording medium described above and presents personal information belonging to a particular individual. The recording region is an inner recording region that presents the personal information as the information of recording region. The individual certificate medium further includes an outer recording region disposed outside the perimeter of the relief layer as viewed in the thickness direction, the outer recording region presenting the same personal information as the personal information included in the inner recording region.

According to the configuration described above, the observer of the individual certificate medium is unlikely to notice the presence of the inner recording region. Therefore, if the outer recording region is falsified in the individual certificate medium, the inner recording region has a high probability of not being falsified. Accordingly, falsification of the individual certificate medium can be found based on a difference between the information in the outer recording region and the information in the inner recording region.

DETAILED DESCRIPTION OF REPRESENTATIVE EMBODIMENTS

Figure 1:
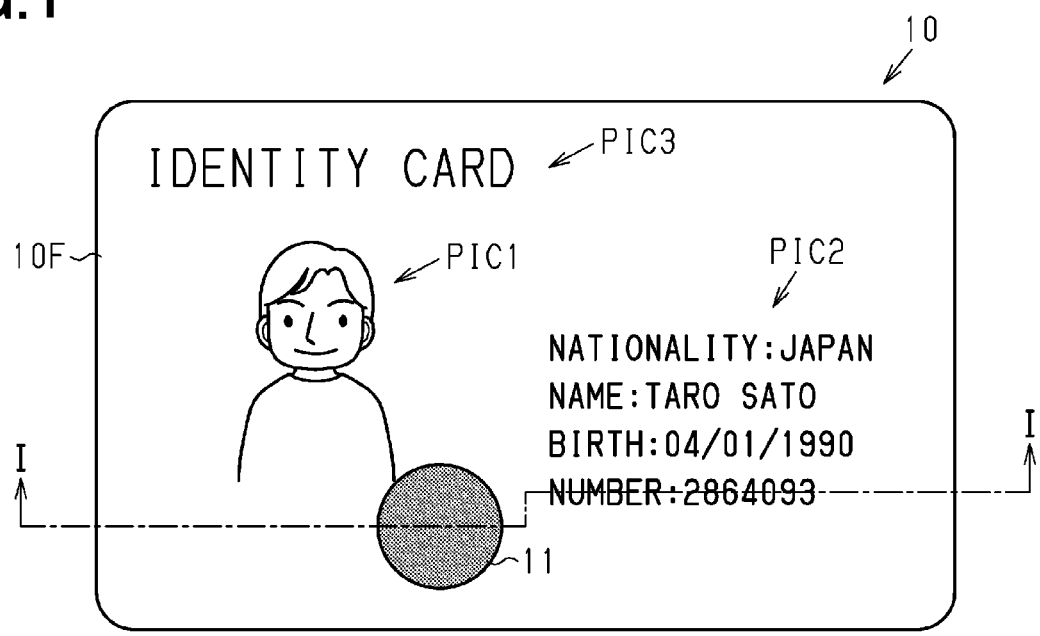
FIG. 1 is a plan view illustrating a structure of an individual certificate medium as viewed perpendicularly to the front surface thereof, according to a first embodiment of an information recording medium and an individual certificate medium.

With reference to the accompanying Figures, a description will now be given of representative embodiments according to the present invention. The present invention is not limited to the following representative embodiments, and appropriate modifications can be made without departing from the spirit of the present invention. The representative embodiments described below are merely examples of the present invention, and the design thereof could be appropriately changed by one skilled in the art. Here, the drawings are schematic, and the relationship between thickness and plane size, the ratio of the thickness of each layer, etc., may be different from actual ones. The embodiments described below are merely examples of the configurations for embodying the technical idea of the present invention, and the technical idea of the present invention should not limit the materials, shapes, structures, and the like of the components to those described below. The technical idea of the present invention can be modified in various ways within the technical scope specified by the claims.

The same constituent elements are denoted by the same reference numerals unless there is a reason for the sake of convenience, and redundant description is omitted. In the drawings referred to in the following description, for clarity, characteristic parts are enlarged, and thus the components are not shown to scale. It is, however, clear that one or more embodiments can be implemented without such details. In addition, known structures and devices may be schematically represented for simplicity.

First Embodiment

Referring to FIGS. 1 to 13, a first embodiment of the present invention embodying an information recording medium and an individual certificate medium will be described. The following description sequentially explains structure, advantageous effects and production method of the individual certificate medium, and materials used for forming components of the individual certificate medium.

[Configuration of Individual Certificate Medium]

Referring to FIGS. 1 to 6, a configuration of the individual certificate medium will be described.

As shown in FIG. 1, an individual certificate medium 10 has a plate shape. The individual certificate medium 10 includes a front surface 10F that is a surface configuring the individual certificate medium 10. In plan view perpendicular to the front surface 10F of the individual certificate medium 10, the individual certificate medium 10 presents a first image PIC1, a second image PIC2 and a third image PIC3. The first and second images PIC1 and PIC2 include information for specifying the owner of the individual certificate medium 10.

The first image PIC1 is a portrait of the owner. The second image PIC2 includes any one of nationality, name, birth date and an individual number, or a combination of these pieces of information. The first image PIC1 may be an image other than a portrait of the owner, or may be only a facial image. The second image PIC2 may include other information, such as sex, than the information mentioned above.

The third image PIC3 presents a name of the individual certificate medium 10. The third image PIC3 may be an image including different information than the name of the individual certificate medium 10. The second and third images PIC2 and PIC3 include either or both of alphabetic characters and numerals. The second and third images PIC2 and PIC3 may include other characters different than symbols and alphabetic characters.

The individual certificate medium 10 includes an optical security patch 11. The optical security patch 11 is observed via the front surface 10F in plan view perpendicular to the front surface 10F. The optical security patch 11 has a circular contour. The optical security patch 11 may have an elliptic contour. The optical security patch 11 may have a contour, such as a polygon, instead of a circular contour. In plan view perpendicular to the front surface 10F of the individual certificate medium 10, the optical security patch 11 does not overlap with any of the first, second and third images PIC1, PIC2 and PIC3. The optical security patch 11 may overlap with at least one of these images in plan view perpendicular to the front surface 10F.

Figure 2:
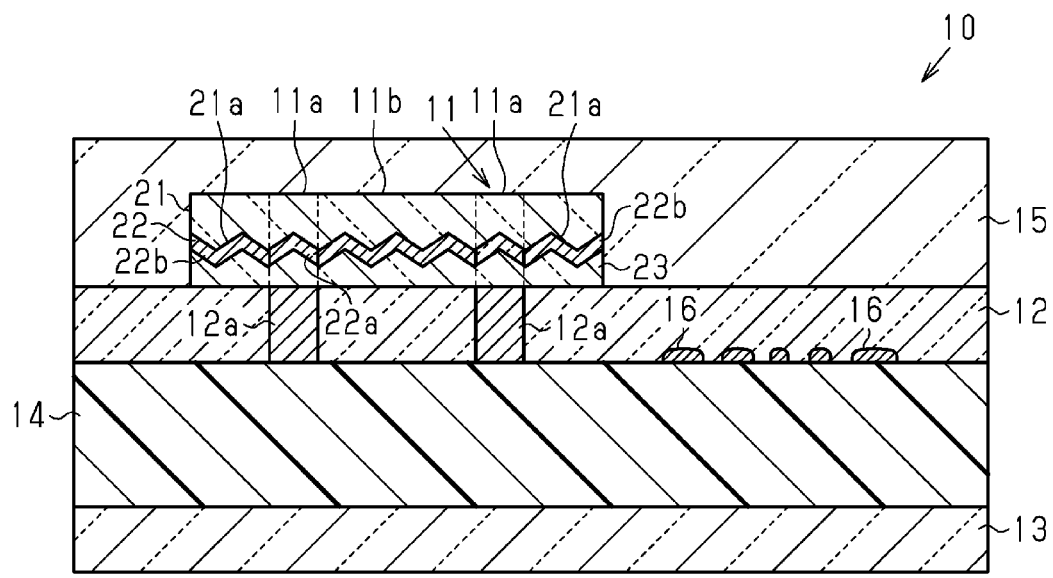
FIG. 2 is a cross-sectional view illustrating a structure of an individual certificate medium of a first example taken along the line I-I of FIG. 1.
Figure 3:
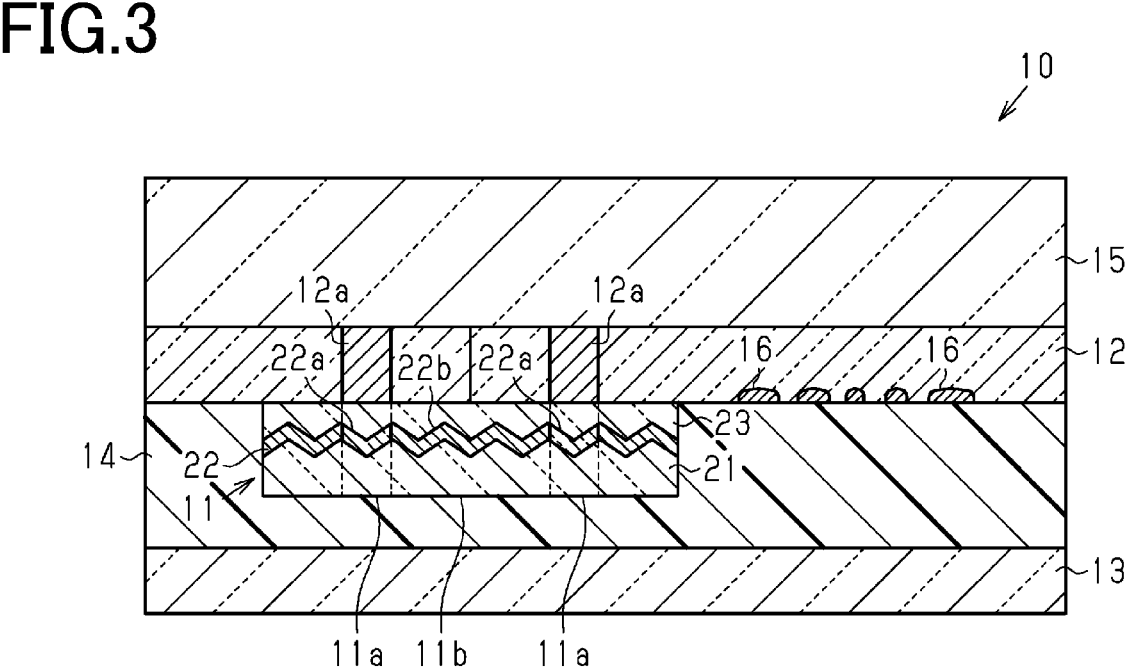
FIG. 3 is a cross-sectional view illustrating a structure of an individual certificate medium of a second example taken along the line I-I of FIG. 1.
Figure 4:
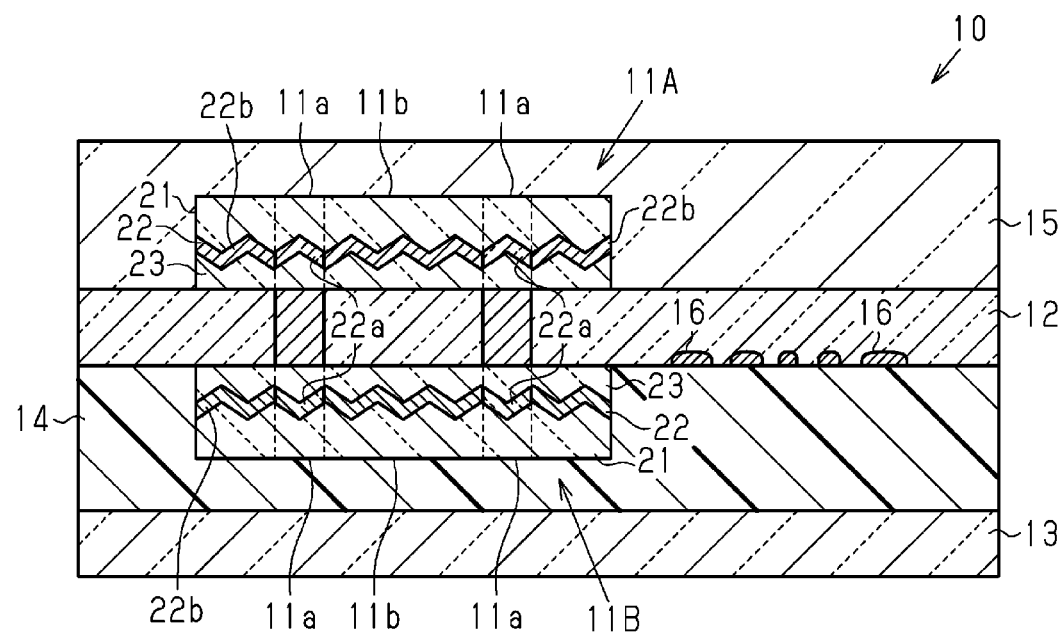
FIG. 4 is a cross-sectional view illustrating a structure of an individual certificate medium of a third example taken along the line I-I of FIG. 1.

FIGS. 2 to 4 each show a cross-sectional structure of the individual certificate medium 10 taken along the line I-I of FIG. 1. In FIGS. 2 to 4, the thickness or size of each component configuring the individual certificate medium 10 is exaggerated, for the sake of convenience of illustration. In FIGS. 2 to 4, the thickness and size, in particular, of the optical security patch of the individual certificate medium 10 are exaggerated more, compared to other components thereof, for the sake of convenience of illustrating the configuration of the optical security patch. The following description sequentially explains three examples of the individual certificate medium 10 having cross-sectional structures different from each other.

First Example

As shown in FIG. 2, the individual certificate medium 10 includes an optical security patch 11 and a recording layer 12. The recording layer 12 includes a recording region 12a and a region other than the recording region 12a. The recording region 12a is a region enclosed by a non-recording region that is carbonizable by application of a laser beam, i.e., is a region enclosed by a region other than the recording region 12a, to present predetermined information by being carbonized by application of a laser beam.

The optical security patch 11 includes a relief layer 21 and a metal layer 22. The relief layer 21 overlaps with the entirety of the recording region 12a as viewed in the thickness direction of the recording layer 12 and includes a plurality of two-dimensionally arrayed convexities 21a in a region extending beyond the recording region 12a. In other words, the relief layer 21 overlaps with the entirety of the recording region 12a as viewed in the thickness direction of the recording layer 12 and includes a plurality of two-dimensionally arrayed convexities 21a in a region larger than the recording region 12a. The plurality of convexities 21a are arrayed at a pitch of 250 nm or more and 500 nm or less. The relief layer 21 has optical transparency.

The metal layer 22 overlaps with the entirety of the recording region 12a as viewed in the thickness direction of the recording layer 12 and covers the plurality of convexities 21a in the region extending beyond the recording region 12a. In other words, the metal layer 22 overlaps with the entirety of the recording region 12a as viewed in the thickness direction of the recording layer 12 and covers the plurality of convexities 21a in the region larger than the recording region 12a. The metal layer 22 is mainly made of metal. The metal layer 22 includes an altered region 22a and a non-altered region 22b. The altered region 22a overlaps with the entirety of the recording region 12a as viewed in the thickness direction of the recording layer 12 and has optical transparency. The non-altered region 22b is a region other than the altered region 22a of the metal layer 22. In the metal layer 22 containing metal as a main component, the altered region 22a is a region where the metal layer has been altered due to application of a laser beam. The altered region 22a is a region or the like where there is neither metal oxide nor metal layer. The altered region 22a has optical transparency that is higher than that of the non-altered region 22b.

The main component of the metal layer 22 may be any one of elements selected from the group consisting of aluminum, nickel and iron, or may be an alloy of these components. In this case, the recording region 12a may be black. The metal layer 22 may contain components in which 80 mass % or more is metal and the remainder are oxygen, carbon and the like.

The metal layer 22 covers a part or all of the relief layer 21. The metal layer 22 can be formed by depositing an inorganic substance such as metal on the relief layer 21. The metal layer 22, after being deposited, may be etched so as to cover only a part of the relief layer 21. The metal layer 22 may be deposited by vacuum vapor deposition, sputtering or chemical deposition. The individual certificate medium 10 may further include a transparent reflective layer on the relief layer 21. The transparent reflective layer may be disposed between the metal layer 22 and the relief layer 21 or on a surface of the metal layer 22 opposite to the relief layer 21. The transparent reflective layer may be made of an inorganic substance. The inorganic substance of the transparent reflective layer may be a metal compound or a silicon compound. The metal compound may be a metal oxide, metal sulfide, metal fluoride or metal nitride. The metal of the metal compound may be aluminum, titanium, zinc or tin. The silicon compound may be a silicon oxide. The transparent reflective layer covers all or a part of the relief layer 21. The transparent reflective layer may be altered by application of a laser beam to serve as an altered transparent reflective layer. The transparent reflective layer does not have to be altered by a laser beam.

With this configuration, an observer OB is likely to recognize the color of the metal layer 22 as being substantially the same as the color of the recording region 12a. Therefore, when the individual certificate medium 10 is observed in the thickness direction of the recording layer 12, the observer OB may have more difficulty in observing the recording region 12a.

The optical security patch 11 includes a first area 11a and a second area 11b. The first area 11a includes the altered region 22a and a portion of the relief layer 21 aligned with the altered region 22a as viewed in the thickness direction of the recording layer 12. The second area 11b includes the non-altered region 22b and another portion of the relief layer 21 aligned with the non-altered region 22b as viewed in the thickness direction of the recording layer 12.

As viewed in the thickness direction of the recording layer 12, the optical security patch 11 is configured such that, among light incident on the entirety of the optical security patch 11, the light incident on the first area 11a is transmitted by the first area 11a and the light incident on the second area 11b is absorbed by the second area 11b to hide the recording region 12a. The optical security patch 11 is also configured to cause diffracted light to emerge from the first and second areas 11a and 11b as viewed in a direction intersecting the thickness direction.

Other than the recording region 12a mentioned above, the recording layer 12 also includes a portion carbonized by application of a laser beam. Such a portion corresponds to the second image PIC2 mentioned above, in plan view perpendicular to the front surface 10F of the individual certificate medium 10. Thus, portions carbonized by application of a laser beam in the recording layer 12 preferably include the recording region 12a which overlaps with the optical security patch 11, and a portion other than the recording region 12a, which does not overlap with the optical security patch 11, as viewed in the thickness direction of the recording layer 12. The area occupied by the recording region 12a in the total area of the portions carbonized by application of a laser beam is preferably 30% or more and 70% or less as viewed in the thickness direction of the recording layer 12.

The individual certificate medium 10 further includes a back surface lamination layer 13, a colored layer 14 and a front surface lamination layer 15. The back and front surface lamination layers 13 and 15 have optical transparency. The back and front surface lamination layers 13 and 15 may be transparent. The colored layer 14 has a color. The colored layer 14 may be white or may have other light colors. The back surface lamination layer 13 may be colored.

In the individual certificate medium 10, the back surface lamination layer 13, the colored layer 14, the recording layer 12 and the front surface lamination layer 15 are laminated in this order. In the individual certificate medium 10, the optical security patch 11 is disposed between the recording layer 12 and the front surface lamination layer 15. In other words, the optical security patch 11 is encapsulated by the recording layer 12 and the front surface lamination layer 15. In the individual certificate medium 10, a printed part 16 is disposed between the colored layer 14 and the recording layer 12. The printed part 16 is a portion formed by printing. The printed part 16 can be formed by printing an ink or toner.

The printed part 16 is formed by printing an ink. The printing may be offset printing, letterpress printing or gravure printing. The ink applied to the formation of the printed part 16 may be an offset ink, a letterpress ink or a gravure ink, which depends on the printing method. The ink used for forming the printed part 16 may be a resin-based ink, an oil-based ink or a water-based ink, depending on the desired composition. Depending on the drying method, the ink used for forming the printed part 16 may be an oxidative polymerization type ink, a penetrative drying type ink, an evaporation drying type ink or an ultraviolet curable ink. The ink may be a pigment ink or a dye ink. The pigment ink may be an inorganic pigment ink or a polymer pigment ink. The dye ink may be an azo dye ink or the like. The printed part 16 includes the second and third images PIC2 and PIC3.

The optical security patch 11 further includes an adhesive layer 23. The adhesive layer 23 is disposed on a surface of the metal layer 22 opposite to the relief layer 21. The metal layer 22 adheres a laminate of the relief layer 21 and the adhesive layer 23 onto the recording layer 12. The adhesive layer 23 has optical transparency. The adhesive layer 23 allows transmission therethrough of an image formed by a layer disposed on a surface of the adhesive layer 23 opposite to the metal layer 22.

Second Example

As shown in FIG. 3, an individual certificate medium 10 of a second example instance is different from the individual certificate medium 10 of the first example in that the optical security patch 11 is disposed between the colored layer 14 and the recording layer 12 instead of being disposed between the recording layer 12 and the front surface lamination layer 15. The optical security patch 11 of the individual certificate medium 10 of the second example also includes a first area 11a and a second area 11b. The first area 11a that includes an altered region 22a is aligned with the recording region 12a as viewed in the thickness direction of the recording layer 12. The second area 11b that includes a non-altered region 22b is aligned with another portion of the recording layer 12 other than the recording region 12a as viewed in the thickness direction of the recording layer 12.

Third Example

As shown in FIG. 4, an individual certificate medium 10 of a third example includes a first optical security patch 11A disposed between the recording layer 12 and the front surface lamination layer 15, and a second optical security patch 11B disposed between the colored layer 14 and the recording layer 12. The first optical security patch 11A has a configuration equivalent to the optical security patch 11 of the individual certificate medium 10 of the first example. The second optical security patch 11B has a configuration equivalent to the optical security patch 11 of the individual certificate medium 10 of the second example.

Figure 5:
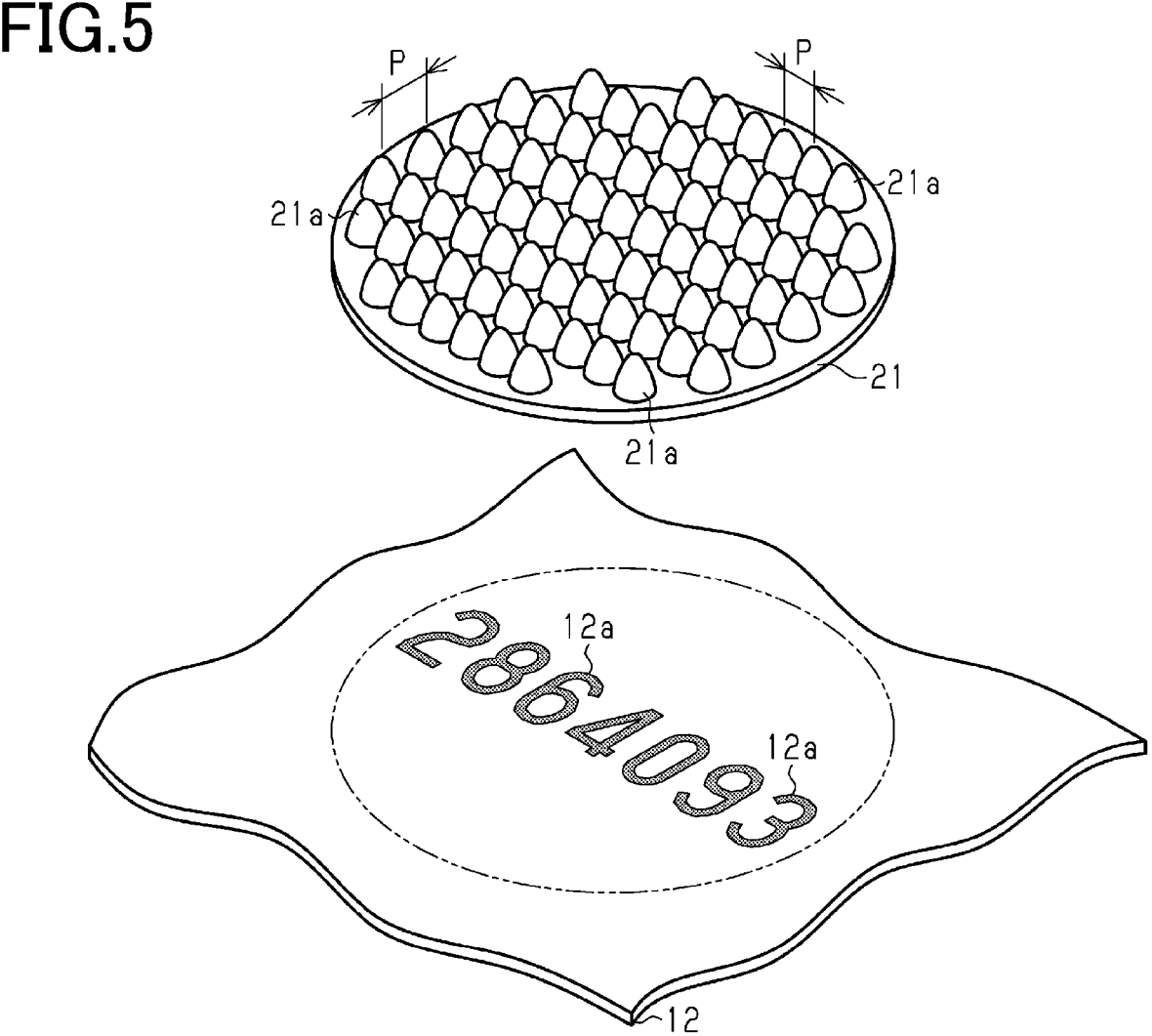
FIG. 5 is a perspective view illustrating a structure of an optical security patch together with a part of a recording layer.
Figure 6:
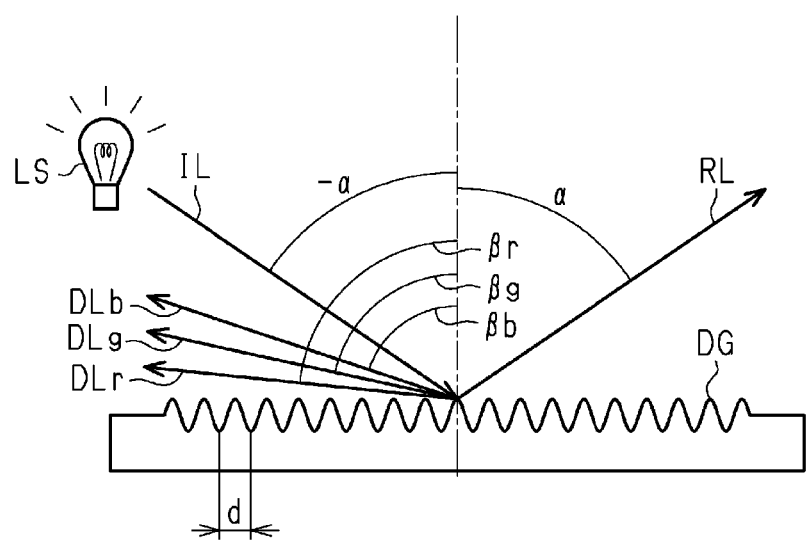
FIG. 6 is a schematic diagram explaining functions of a relief layer included in an optical security patch.

Referring to FIGS. 5 and 6, a configuration of the optical security patch 11 will be more specifically described. The optical security patches included in the individual certificate media 10 of the first to third examples are differently disposed relative to the recording layer 12 but have common functions as optical security patches. Therefore, the following description is focused on the optical security patch 11 of the individual certificate medium 10 of the first example and omits explanation of the optical security patches included in the individual certificate media 10 of the second and third examples.

In FIG. 5, for the sake of convenience of illustration, the plurality of convexities 21a included in the relief layer 21 are indicated as convexities protruded from the recording layer 12 toward the front surface lamination layer 15, and are exaggerated in size. Also, in FIG. 5, the metal layer 22 and the adhesive layer 23 of the optical security patch 11 are omitted.

As shown in FIG. 5, the relief layer 21 includes a plurality of convexities 21a which are two-dimensionally arrayed as mentioned above. The plurality of convexities 21a are one- or two-dimensionally arrayed at regular intervals. Of the plurality of convexities 21a, those which are provided in one direction are arrayed at a pitch P of 190 nm or more and 580 nm or less and those which are provided in another direction perpendicular to the first direction are also arrayed at the pitch P of 190 nm or more and 580 nm or less. The plurality of convexities 21a have peaks the distance between which corresponds to the pitch P of the array of the convexities 21a. As viewed in the thickness direction of the recording layer 12, the plurality of convexities 21a are two-dimensionally disposed over the entire or a part of the relief layer 21. It should be noted that the metal layer 22 covers all or a part of the convexities 21a.

Each convexity 21a substantially has a conical surface. It is preferable that all the convexities 21a have sizes equal to each other, i.e., have surface areas that are equal when projected onto the recording layer 12 and heights that are equal.

In a cross section perpendicular to the direction in which the convexities 21a protrude, each convexity 21a has a refractive index which is determined by an area ratio at the cross section between the relief layer 21 and the material around the relief layer 21. If the pitch P of the convexities 21a is approximately not more than the wavelength of visible light, the refractive indices of the convexities 21a at the cross section can be regarded as being almost equal to each other. The pitch P of the convexities 21a is not more than the center wavelength of visible light. Specifically, the pitch P of the convexities 21a can be 580 nm or less. In a cross section perpendicular to the direction in which the convexities 21a protrude, the ratio of area occupied by the relief layer 21 gradually decreases toward the adhesive layer 23, while the ratio of area occupied by the material around the individual convexities 21a gradually increases. Accordingly, in the relief layer 21, there is nowhere that refractive indices greatly change in the direction in which the convexities 21a protrude. Therefore, reflection or refraction of light incident on the convexities 21a is minimized, and the light is transmitted through the convexities 21a.

Since the convexities 21a are covered with the metal layer 22 whose main component is metal, light that has been transmitted through the convexities 21a contacts the metal layer 22 and is absorbed. In addition, since light incident on the convexities 21a at the boundary with the metal layer 22 is multiply reflected, a part of light incident on the convexities 21a at every light reflection on the boundary is absorbed by the metal layer 22.

In the metal layer 22, the non-altered region 22b having metallic glossiness absorbs light as described above, while the altered region 22a having optical transparency does not substantially absorb light. Therefore, light incident on the altered region 22a is transmitted therethrough.

The recording region 12a presents personal information for specifying the owner of the individual certificate medium 10. The recording region 12a is an example of the inner recording region. The recording region 12a presents an individual number included in the second image PIC2 as personal information. Specifically, the individual certificate medium 10 includes a printed part 16, as an example of the outer recording region, which is disposed outside the perimeter of the relief layer 21 as viewed in the thickness direction of the recording layer 12. In the printed part 16, the second image PIC2 including the same personal information as in the recording region 12a is printed.

It should be noted that the personal information recorded in the recording region 12a may be the same as any one of the pieces of personal information in the first image PIC1, i.e., any one of nationality, name and birth date mentioned above, or a combination of these pieces of information. The personal information recorded in the recording region 12a may be the same as the personal information in the first image PIC1. In this case, the recording region 12a may display a portrait of the owner.

Referring to FIG. 6, diffracted light emerging from the relief layer 21 will be explained.

FIG. 6 schematically shows a diffraction grating having a period smaller than the center wavelength, i.e., 580 nm, of visible light. It should be noted that, for the sake of convenience of illustration, FIG. 6 indicates only red diffracted light, green diffracted light and blue diffracted light, as primary diffracted light emerging from the diffraction grating.

In a circumstance where light travels parallel to a plane perpendicular to the longitudinal direction of a groove of a diffraction grating, $m^{th}$ order diffracted light ($m=0, \pm 1, \pm 2, \ldots$) in the diffraction grating will have an emission angle β which can be calculated by the following formula.

$$d = m\lambda/(\sin \alpha - \sin \beta) \quad \text{Formula (1)}$$

In Formula (1), d is a period of the diffraction grating, m is a diffraction order, and λ is a wavelength of incident light or diffracted light. Also, a is an emission angle of $0^{th}$ order diffracted light, i.e., transmitted light or specular reflected light. In other words, the absolute value of a is equal to the angle of incident light. In a reflective diffraction grating, the incidence direction of incident light and emission direction of specular reflected light are symmetrical about a direction of observing the diffraction grating from the front, i.e., symmetrical about a perpendicular direction. The perpendicular direction corresponds to the thickness direction of the recording layer 12 of the individual certificate medium 10 described above.

When the diffraction grating is a reflection type, the angle α is 0° or more and less than 90°. When the diffraction grating is illuminated from an oblique direction relative to the perpendicular direction, i.e., relative to a boundary value of 0°, the angular range including the emission direction of the specular reflected light will be a positive range and the angular range including the incidence direction of the illuminated light will be a negative range. If the emission direction of diffracted light is included in the same range as that of emission direction of specular reflected light, i.e., included in the positive range, the angle β will have a positive value. If the emission direction of diffracted light is included in the same range as that of incidence direction of illuminated light, i.e., included in the negative range, the angle β will have a negative value.

When an observer observes a diffraction grating in plan view, among the diffracted light emerging from the diffraction grating, the diffracted light contributing to displaying the image observed by the observer is only the diffracted light whose emission angle β is 0°. However, if the period d is smaller than the wavelength λ, there is no incidence angle α that satisfies Formula (1). Therefore, the observer observing the diffraction grating in plan view cannot observe the diffracted light. Thus, of diffraction gratings, those which have a small period d, i.e., those which have a period d smaller than the wavelength λ, cause no diffracted light to emerge in the perpendicular direction, and those which have a period d of approximately the wavelength λ cause diffracted light to emerge which is not substantially observable in the perpendicular direction.

The convexities 21a disposed at regular intervals serve as a diffraction grating.

As shown in FIG. 6, a diffraction grating DG of the convexities 21a has a period d which is larger than ½ the minimum wavelength of visible light and smaller than the center wavelength of visible light. Specifically, the diffraction grating DG has a period d which is larger than 190 nm and smaller than 580 nm. Incident light IL emerging from a light source LS is white light which has a plurality of rays having wavelengths that are different from each other. When the incident light IL is incident on the diffraction grating DG from an oblique direction, the diffraction grating DG causes light RL to emerge which is specular reflected light or $0^{th}$ order diffracted light.

The diffraction grating DG causes red diffracted light DLr, green diffracted light DLg and blue diffracted light DLb to emerge as primary diffracted light. It should be noted that the red, green and blue diffracted lights DLr, DLg and DLb respectively have emission angles βr, βg and βb which are all negative.

For the reasons described above, the optical security patch 11 presents a black image or a gray image in the thickness direction of the recording layer 12. It should be noted that the term black refers to a state where reflectance is 10% or less in the light of all the wavelengths included in the range of 400 nm or more and 700 nm, when the intensity of the specular reflected light is measured by illuminating white light in the thickness direction of the recording layer 12 onto the optical security patch 11. It should be noted that the term gray refers to a state where reflectance is 10% or more and about 25% or less in the light of all the wavelengths included in the range of 400 nm or more and 700 nm or less, when the intensity of specular reflected light is measured by illuminating white light in the thickness direction of the recording layer 12 onto the optical security patch 11.

If a black image is to be displayed, the optical security patch 11 is favorable in that the rate of change of reflection indices in the protrusion direction of the convexities 21a decreases more with the increase in height of the convexities 21a. In contrast, as the height of the convexities 21a decreases, reflectance at the convexities 21a increases more, and makes lightness of the image produced by the optical security patch 11 greater. Consequently, the optical security patch 11 presents a gray image.

The pitch P of the convexities 21a may be in the range of 190 nm or more and 580 nm or less. The height of the convexities 21a may be ½ or more the pitch P of the convexities 21a. If the height of the convexities 21a is ½ or more the pitch P, the convexities 21a may minimize reflection of incident light in the thickness direction of the recording layer 12. The height of the convexities 21a may be not more than the pitch P. If the height of the convexities 21a is not more than the pitch P, the convexities 21a can be easily formed. Therefore, the height of the convexities 21a is preferably 95 nm or more and 580 nm or less.

[Advantageous Effects of Individual Certificate Medium]

Figure 7:
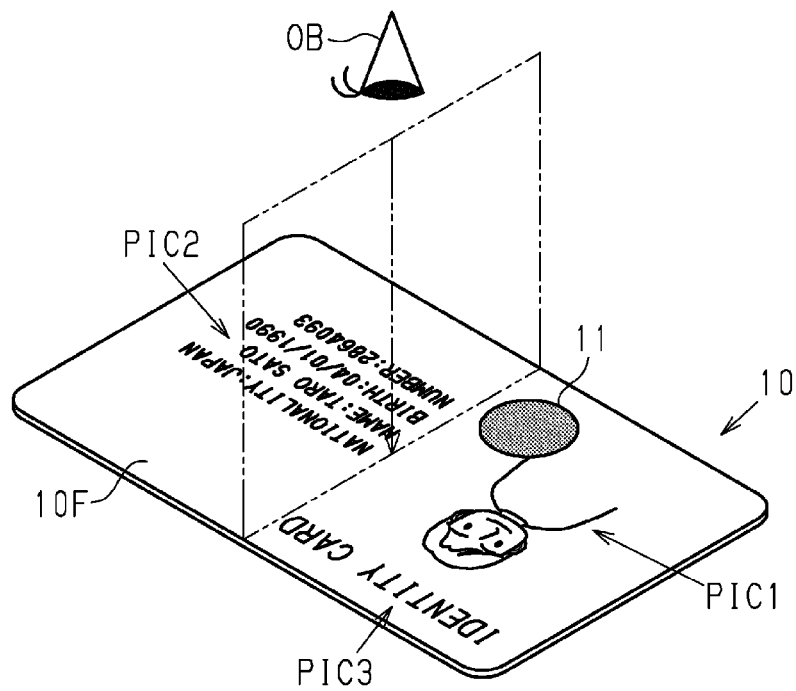
FIG. 7 is a diagram explaining effects of an individual certificate medium.
Figure 8:
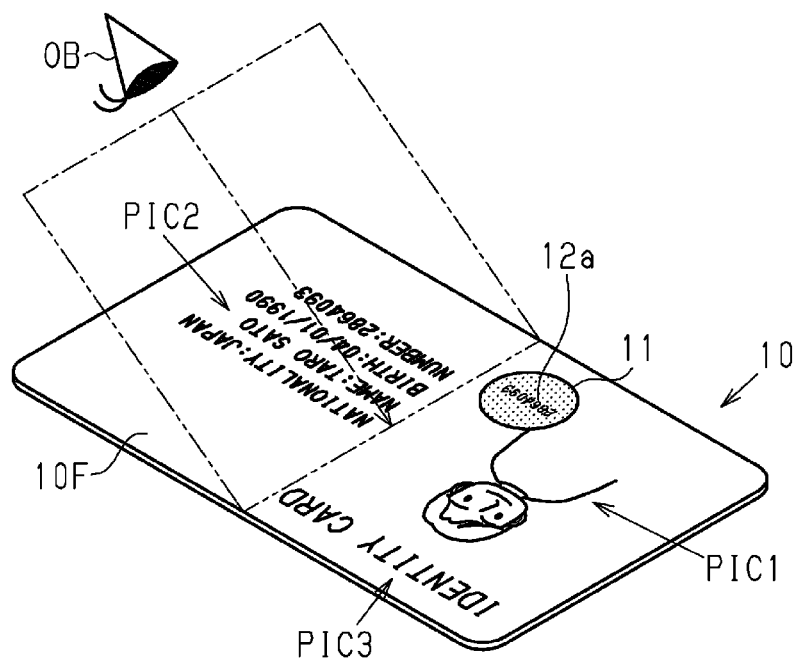
FIG. 8 is a diagram explaining effects of an individual certificate medium.

Referring to FIGS. 7 and 8, advantageous effects of the individual certificate medium 10 will be described. The following description explains advantageous effects of the individual certificate medium 10 in a configuration in which the recording region 12a is black.

As shown in FIG. 7, when an observer OB observes the individual certificate medium 10 in the thickness direction of the recording layer 12 or, in other words, in the normal direction to the front surface 10F, the second area 11b of the optical security patch 11 absorbs light incident on the optical security patch 11 and the first area 11a transmits light incident on the optical security patch 11. Therefore, in the optical security patch 11, the portion corresponding to the second area 11b in plan view perpendicular to the front surface 10F is observed to be a black region by the observer OB due to absorption of light. In the optical security patch 11, the portion corresponding to the first area 11b in plan view perpendicular to the front surface 10F is observed to be a black region by the observer OB due to the color of the recording region 12a. Specifically, this is because the recording region 12a of the recording layer 12 is observed via the altered region 22a.

Therefore, with the recording region 12a contained in the recording layer 12 being hidden by the optical security patch 11, the observer OB observes a complete image formed by the optical security patch 11 and the recording region 12a. In this way, when the individual certificate medium 10 is observed in the thickness direction of the recording layer 12, the information in the recording region 12a forms a latent image.

As shown in FIG. 8, when the observer OB observes the individual certificate medium 10 in a direction intersecting the thickness direction of the recording layer 12 or, in other words, in a direction intersecting the normal direction to the front surface 10F, the observer OB can observe diffracted light emerging from the optical security patch 11. In the optical security patch 11 in this case, the second area 11b causes diffracted light to emerge toward the observer OB and the first area 11a also causes diffracted light to emerge toward the observer OB. However, the second area 11b causes emergence of diffracted light having higher brightness due to reflection at the non-altered region 22b, while the first area 11a causes emergence of reflected light resulting from difference in refractive index between the relief layer 21 and the altered region 22a. Accordingly, the first area 11a only causes emergence of diffracted light having lower brightness than the second area 11b. Moreover, since the first area 11a is optically transparent, the observer OB can also observe the recording region 12a disposed in the underlayer of the first area 11a via the first area 11a. Thus, the observer OB can observe the recording region 12a due to the contrast between the color of the diffracted light emerging from the second area 11b and the color of the recording region 12a transmitted through the first area 11a.

As described above, according to the individual certificate medium 10, the image presented by the individual certificate medium 10 can be changed when the direction of observing the individual certificate medium 10 is changed. Consequently, visual effects of the individual certificate medium 10 are enhanced.

In general, when an observer observes an item, in particular, an item having small light-reflection and light-scattering performances and high light absorptivity, the observer will adjust the positions of a light source and the item relative to the observer's eye so as to be at the positions enabling the observer to observe specular reflected light. Therefore, if the observer is not aware of the optical security patch 11 causing emergence of diffracted light of the negative range mentioned above, the observer is unlikely to observe the diffracted light. In this case, the observer is unlikely to notice the optical security patch 11 being capable of causing diffracted light to emerge.

In this regard, if an optical security patch includes a plurality of convexities arrayed at a pitch larger than the pitch P of the convexities 21 of the optical security patch 11 described above, the observer has a high probability of observing diffracted light because the optical security patch causes diffracted light of a positive range to emerge, even if the observer is not aware of this fact. In such an optical security patch, the angle formed between the perpendicular direction mentioned above and the emission direction of diffracted light is small. This may also allow the observer to easily observe diffracted light emerging from the optical security patch.

For the reasons described above, the observer of the individual certificate medium 10 is unlikely to notice the presence of the recording region 12a. Therefore, if the first image PIC1 is falsified in the individual certificate medium 10, the recording region 12a has a high probability of not being falsified. Accordingly, falsification of the individual certificate medium 10 can be found based on a difference between the information in the second image PIC2 and the information in the recording region 12a.

(Method of Producing Individual Certificate Medium)

Referring to FIGS. 9 to 13, a method of producing the individual certificate medium 10 will be described. The following description specifically explains a method of producing the individual certificate medium 10 of the first example, among the individual certificate media 10 of the first to third examples. Prior to explaining the production method of the individual certificate medium 10, the configuration of a transfer foil used for the production will be explained.

Figure 9:
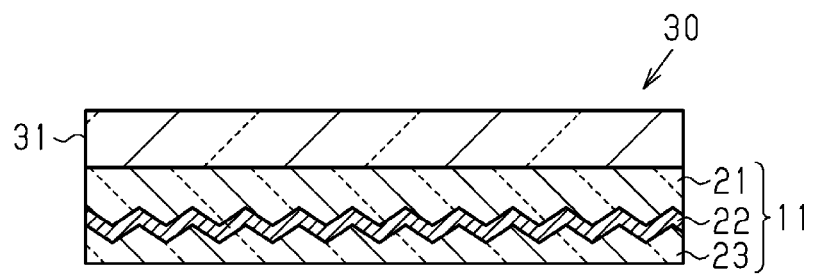
FIG. 9 is a cross-sectional view illustrating a structure of a transfer foil used for producing an individual certificate medium.

As shown in FIG. 9, a transfer foil 30 includes the optical security patch 11 described above, and a carrier film 31 that supports the optical security patch 11. The optical security patch 11 is supported by the carrier film 31 so as to be separable therefrom. When forming the transfer foil 30, the carrier film 31 is prepared first. The carrier film 31 may be a plastic film. On the carrier film 31, the surface on which the optical security patch 11 is to be formed may be treated to make the optical security patch 11 easily separable from the carrier film 31.

Next, a relief layer 21 is formed on a surface of the carrier film 31. When forming the relief layer 21, a coating film for forming the relief layer 21 is provided first to the carrier film 31. Then, an original plate for forming a plurality of convexities 21a is pressed against a surface of the coating film opposite to the surface of the coating film in contact with the carrier film 31. In this state, or after pressing the original plate against the coating film, the coating film is cured. Thus, a relief layer 21 having a plurality of convexities 21a is formed. On the surface opposite to the surface in contact with the carrier film 31 in the relief layer 21, a metal layer 22 is formed. Then, on a surface opposite to the surface in contact with the relief layer 21 in the metal layer 22, an adhesive layer 23 is formed. The metal layer 22 may be formed by a deposition method. The deposition method may be a sputtering or vacuum vapor deposition method. Thus, a transfer foil 30 can be obtained.

Besides the relief layer 21, the metal layer 22 and the adhesive layer 23, the transfer foil 30 may include intermediate layers disposed between these layers.

Figure 10:
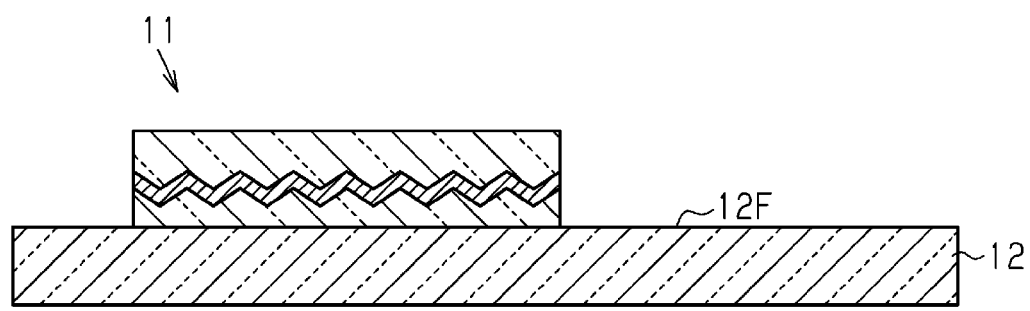
FIG. 10 illustrates a transfer process in a method of producing an individual certificate medium.

As shown in FIG. 10, a recording layer 12 is prepared for producing an individual certificate medium 10. The recording layer 12 may be a plastic sheet. The plastic may be thermoplastic. Next, an optical security patch 11 is transferred to a front surface 12F of the recording layer 12 by using the transfer foil 30 described above. The optical security patch 11 may be transferred to a front surface lamination layer from the transfer foil 30.

Figure 11:
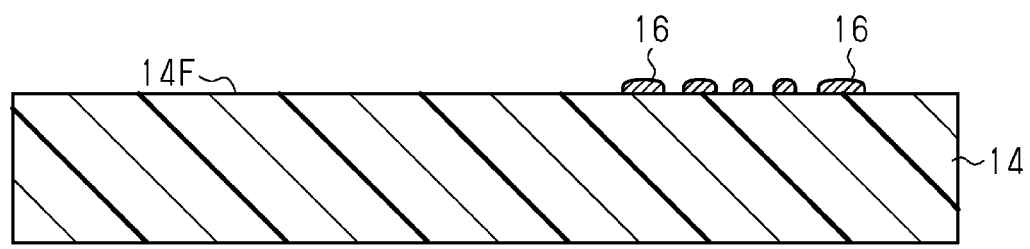
FIG. 11 illustrates a printing process in a method of producing an individual certificate medium.

As shown in FIG. 11, a colored layer 14 is prepared. The colored layer 14 may be a plastic sheet. The plastic may be thermoplastic. Then, a printed part 16 is formed on a front surface 14F of the colored layer 14. The printed part 16 may be formed on the back surface of the recording layer 12, or a part of the printed part 16 may be formed on the front surface 14F of the colored layer 14 with the remaining part of the printed part 16 being formed on the back surface of the recording layer 12.

Figure 12:
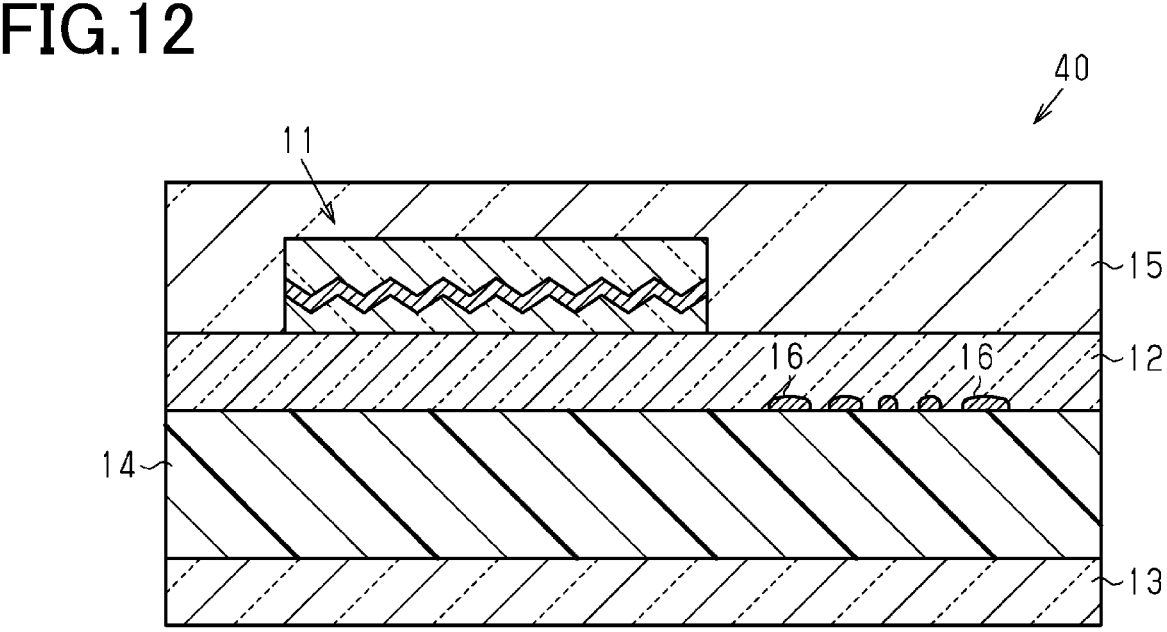
FIG. 12 illustrates a lamination process in a method of producing an individual certificate medium.

As shown in FIG. 12, a back surface lamination layer 13 and a front surface lamination layer 15 are prepared. Then, the back surface lamination layer 13, the colored layer 14, the recording layer 12 and the front surface lamination layer 15 are laminated in this order and integrated to thereby form a laminate 40. These layers may be integrated by heating or pressing. In this case, the front surface lamination layer 15 is laminated on the recording layer 12 such that the optical security patch 11 on the recording layer 12 is sandwiched between the recording layer 12 and the front surface lamination layer 15. Thus, a laminate 40 having an optical security patch 11 on the inside thereof can be obtained.

Figure 13:
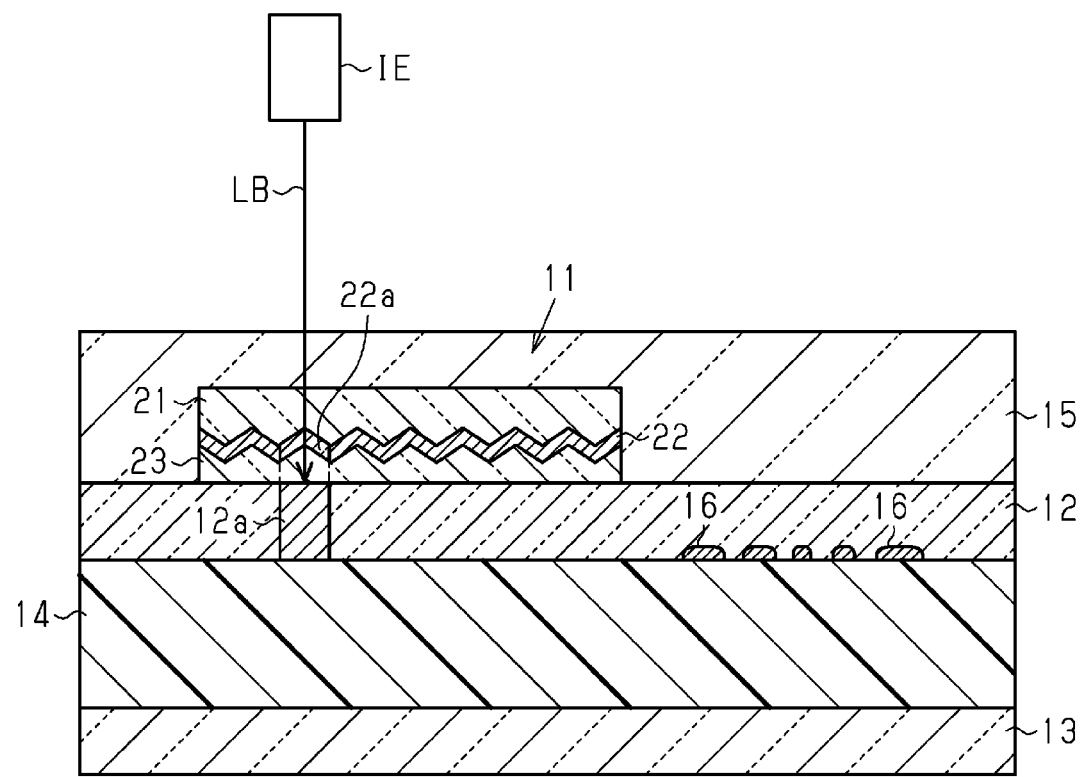
FIG. 13 illustrates an irradiation process in a method of producing an individual certificate medium.

As shown in FIG. 13, a laser beam LB is applied to a part of the recording layer 12 of the laminate from a front surface lamination layer 15 side of the recording layer 12, via the front surface lamination layer 15 and the optical security patch 11. The laser beam LB is applied from an irradiation device IE. Thus, a recording region 12a is formed in the recording layer 12 at a portion irradiated with the laser beam LB. Simultaneously with this, a part of the metal layer 22 of the optical security patch 11 irradiated with the laser beam LB becomes an altered region 22a. The part of the metal layer 22 irradiated with the laser beam LB is altered by energy from the laser beam LB.

When the laser beam LB is applied to the recording layer 12 via the front surface lamination layer 15 and the optical security patch 11, focus and output of the laser beam LB may be determined such that a recording region 12a can be formed in the recording layer 12 and a part of the metal layer 22 can be altered.

When the laser beam LB is applied to the recording layer 12 and the metal layer 22 and when the energy provided to these layers exceeds a predetermined amount, the area of the portion altered in the metal layer 22 becomes larger than the area of the portion carbonized in the recording layer 12 as viewed in the thickness direction of the recording layer 12. To equalize the area of the altered region 22a with the area of the recording region 12a as viewed in the thickness direction of the recording layer 12, the energy of the laser beam LB applied to the recording layer 12 for formation of a perimeter of the recording region 12a may be made smaller than the energy of the laser beam LB applied to the recording layer 12 for formation of the inside of the perimeter of the recording region 12a. The laser beam LB may be applied to the recording layer 12 such that the energy of the laser beam LB becomes smaller as it is applied from the inside of the recording region 12a toward the perimeter. The laser beam LB to be applied may have an output in the range of 0.1 W or more and 1 W or less. The laser beam LB to be applied may have a pulse width in the range of 10 ns or more and 1 µs or less. The recording region 12a may have an optical density (OD) in the range of 1.0 or more and 2.0 or less. The optical density (OD) of the recording region 12a can be controlled by controlling the speed of drawing with the laser.

Since the laser beam LB is applied in the thickness direction of the recording layer 12, one recording region 12a and one altered region 22a are formed mutually aligned in the optical security patch 11 as viewed in the thickness direction of the recording layer 12. Thus, the individual certificate medium 10 of the first example described referring to FIG. 2 can be obtained.

In the case of forming the individual certificate medium 10 of the second example, the colored layer 14 may be laminated on the recording layer 12 such that the optical security patch 11 is sandwiched between the colored layer 14 and the recording layer 12 when forming the laminate 40. Then, the laser beam LB may be applied to the recording layer 12 via the front surface lamination layer 15. In this case, focus and output of the laser beam LB may be determined such that a recording region 12a can be formed in the recording layer 12 and a part of the metal layer 22 under the recording layer 12 can be altered.

In the case of forming the individual certificate medium 10 of the third example, the first optical security patch 11A may be transferred onto the front surface 12F of the recording layer 12 by using a transfer foil 30, and the second optical security patch 11B may be transferred onto the back surface of the recording layer 12 by using a transfer foil 30. Then, when forming the laminate 40, the colored layer 14, the recording layer 12 and the front surface lamination layer 15 may be laminated such that the first optical security patch 11A is sandwiched between the recording layer 12 and the front surface lamination layer 15, and the second optical security patch 11B is sandwiched between the colored layer 14 and the recording layer 12.

Then, the laser beam LB may be applied to the recording layer 12 via the front surface lamination layer 15 and the first optical security patch 11A. In this case, focus and output of the laser beam LB may be determined such that a recording region 12a can be formed in the recording layer 12 and a part of the metal layer 22 of the first optical security patch 11A and a part of the metal layer 22 of the second optical security patch 11B can be altered.

[Materials for Forming Components]

Materials for forming components of the individual certificate medium 10 will be described.

[Lamination Layers]

The back surface lamination layer 13 and the front surface lamination layer 15 may each be a plastic sheet. The plastic sheet may be a PET (polyethylene terephthalate) sheet, a PEN (polyethylene naphthalate) sheet, a PP (polypropylene) sheet, a PVC (polyvinyl chloride) sheet, an amorphous polyester (PET-G) sheet, or a polycarbonate (PC) sheet. Of these sheets, the PVC sheet, the PET-G sheet or the PC sheet is easily processable when integrated into a laminate by heating or pressing and thus may be preferable as a base material of individual certificate media used for cards or passports.

The lamination layers may each have a thickness of 50 μm or more and 400 μm or less. With the thickness being 50 μm or more, the lamination layers exert enhanced physical strength balanced with ease of handling. Therefore, wrinkles are less likely to be formed in the lamination layers when forming the printed part 16. With the thickness being 400 μm or less, the influence of thickness variation or warpage of the lamination layers is minimized when producing the individual certificate medium 10. The lamination layers may each have a thickness of 75 μm or more and 100 μm or less.

[Recording Layer]

The recording layer 12 may be a plastic sheet which has a characteristic of being carbonized when irradiated with a laser beam having a predetermined wavelength. The recording layer 12 may contain polycarbonate as a main material, and an energy absorber as an additive for absorbing the laser beam. Such a sheet may be, for example, LEXAN® series SD8B94 manufactured by SABIC.

The recording layer 12 may have a thickness of 50 μm or more and 400 μm or less, for the same reasons stated for the back and front surface lamination layers 13 and 15. The recording layer 12 may have a thickness of 75 μm or more and 100 μm or less.

[Colored Layer]

The colored layer 14 may be a plastic sheet. Materials used for the back and front surface lamination layers 13 and 15 may be applied to the plastic sheet. The plastic sheet of the colored layer 14 may contain a colorant. The colorant may be a dye, a pigment, or the like.

The colored layer 14 may have a thickness of 50 μm or more and 400 μm or less, for the same reasons stated for the back and front surface lamination layers 13 and 15. The colored layer 14 may have a thickness of 75 μm or more and 100 μm or less.

[Printed Part]

The printed part 16 is colored and has a configuration of characters, motifs or the like to provide the individual certificate medium 10 with predetermined information.

The printed part 16 is formed by printing an ink. The printing may be offset printing, letterpress printing or gravure printing. The ink used for forming the printed part 16 may be an offset ink, a letterpress ink or a gravure ink, which depends on the printing method. The ink used for forming the printed part 16 may be a resin-based ink, an oil-based ink or a water-based ink, depending on the desired composition. Depending on the drying method, the ink used for forming the printed part 16 may be an oxidative polymerization type ink, a penetrative drying type ink, an evaporation drying type ink or an ultraviolet curable ink.

The ink used for forming the printed part 16 may be a functional ink whose color depends on the angle of light incident on the individual certificate medium 10 or the angle of observing the individual certificate medium 10. The functional ink may be an optically variable ink, a color shifting ink, a pearl ink, or the like.

The printed part 16 may be formed by electrophotography using toner. When forming the printed part 16 by electrophotography, toner is prepared by adhering colored particles such as of graphite or pigment to plastic particles having electrostatic properties. Then, the toner is transferred to an object to be printed by making use of static electrical charge. After that, the object to be printed, to which the toner has been transferred, is heated to fix the toner thereto. Thus, a printed part 16 can be formed on the lamination layer or the printing layer 12 described above.

[Carrier Film]

The carrier film 31 of the transfer foil 30 may be a plastic film. The plastic film may be a PEN film or a PP film. The material used for the carrier film 31 may be a material which is unlikely to deform or alter the carrier film 31 due to heat applied thereto when a relief layer 21 is formed thereon or due to the solvent brought into contact therewith. The carrier film 31 may be paper, synthetic paper, plastic multiple-layer paper, resin-impregnated paper, or the like.

The carrier film 31 may have a thickness of 4 μm or more. The carrier film 31 may have a thickness of 12 μm or more and 50 μm or less. When the carrier film 31 has a thickness of 4 μm or more, the physical strength of the carrier film 31 is enhanced, balanced with ease of handling.

[Relief Layer]

The material used for the relief layer 21 may be a thermoplastic resin, a thermosetting resin, or an ultraviolet curable resin. The thermoplastic resin may be an acrylic resin, an epoxy resin, a cellulose resin or a vinyl resin used singly or mixed, or a complex or a copolymer resin thereof. The thermosetting resin may be a urethane resin, a melamine resin, an epoxy resin or a phenol resin. The ultraviolet curable resin may be an acrylic resin, a urethane resin or an epoxy resin used singly or mixed, or a complex or a copolymer resin thereof. The relief layer may have a thickness of 1 μm or more and 5 μm or less.

The material applied to formation of the relief layer 21 may be a cured polymer. The cured polymer may be a cured monomer, oligomer or polymer having an ethylenically unsaturated bond or an ethylenically unsaturated group. Of these materials, the monomer may be 1,6-hexanediol, neopentyl glycol diacrylate, trimethylolpropane triacrylate, pentaerythritol triacrylate, pentaerythritol tetraacrylate, dipentaerythritol pentaacrylate, dipentaerythritol hexaacrylate, or the like. The oligomer may be epoxy acrylate, urethane acrylate, polyester acrylate, or the like. The polymer may be a urethane modified acryl resin or an epoxy-modified acryl resin.

[Metal Layer]

The metal layer 22 mainly contains metal. The metal of the metal layer 22 may be aluminum, nickel, iron, gold, copper or tin used singly, or an alloy thereof. As metal used for the metal layer 22, aluminum, nickel or iron used singly, or an alloy thereof is preferable due to having good processability. The metal layer 22 may be formed by a deposition method. The deposition method used for the metal layer 22 may be a vacuum vapor deposition method or sputtering method. The metal layer 22 may have a thickness of 50 Å or more and 3,000 Å or less. The metal layer 22 may have a thickness of 200 Å or more and 1,000 Å or less. When the metal layer 22 has a thickness of 200 Å or more and 1,000 Å or less, the layer can be easily processed by a laser.

[Adhesive Layer]

The adhesive layer 23 contains an adhesive as a main component. The adhesive may be a polyester resin, a urethane resin, an acrylic resin or a vinyl chloride resin. The adhesive layer 23 may contain a modifier. The modifier may be an adhesion enhancing agent, a filler, a softener, a heat or light stabilizer or an antioxidant used singly or mixed.

The adhesion enhancing agent may be a rosin resin, a terpene phenol resin, a terpene resin, an aromatic hydrocarbon-modified terpene resin, a petroleum resin, a coumarone-indene resin, a styrene resin, a phenol resin or a xylene resin used singly or mixed, or a copolymer resin thereof. The filler may be zinc white, titanium oxide, silica, calcium carbonate or barium sulfate. The softener may be process oil, liquid rubber or plasticizer. The heat or light stabilizer may be benzophenone, benzotriazole or hindered amine. The antioxidant may be an anilide, phenol, phosphite or thioester.

The adhesive layer 23 may have a thickness of 0.1 μm or more and 10 μm or less. The adhesive layer 23 may have a thickness of 1 μm or more and 5 μm or less.

When forming the adhesive layer 23, an adhesive is applied to a surface of a separating member, followed by drying. Then, the adhesive is bonded to the metal layer 22. After that, the separating member is detached from the adhesive to thereby form an adhesive layer 23 on the metal layer 22.

The adhesive can be applied by a coating machine, such as a roll coater, a knife coater, a roll knife coater, an air knife coater, a die coater, a bar coater, a gravure coater or a curtain coater.

EXAMPLES

Example 1

Prior to producing an individual certificate medium, a transfer foil including an optical security patch was formed. When forming the transfer foil, a PET film (Lumirror® 25T60 manufactured by Toray Industries, Inc.) having a thickness of 25 μm was used as a carrier film.

Next, an ink for a relief layer having the following composition was applied to a surface of the PET film by gravure printing to form a coating film having a thickness of 2 μm. Then, after volatilizing and removing the solvent contained in the coating film, the coating film was roll-formed by pressing a metal cylindrical plate against a surface of the coating film opposite to the surface in contact with the carrier film. Thus, a plurality of convexities were formed. In this case, pressure, temperature and speed of pressing were respectively set to 2 Kgf/cm², 240° C. and 10 m/min.

In the relief layer, the surface opposite to the surface in contact with the carrier film was provided with an aluminum layer as a metal layer having a thickness of 500 Å. The aluminum layer was formed by vacuum vapor deposition. Next, an adhesive layer ink having the following composition was applied to a surface of the aluminum layer opposite to the surface in contact with the relief layer to form a coating film having a thickness of 4 After that, the solvent contained in the coating film was volatilized and removed to thereby form an adhesive layer. Thus, a transfer foil including an optical security patch was obtained.

| [Ink for relief layer] | |
| --- | --- |
| Polymer methacrylate (PMMA) resin | 2 parts |
| Low viscosity nitrocellulose | 12 parts |
| Cyclohexanone | 10 parts |
| [Ink for adhesive layer] | |
| Polyester resin | 20 parts |
| Methyl ethyl ketone | 40 parts |
| Toluene | 50 parts |

The optical security patch was transferred to a surface of a recording layer (LEXAN SD8B94 manufactured by SABIC) having a thickness of 100 μm by using a hot stamp transfer machine. In this case, temperature and time of transfer were respectively set to 120° C. and 1 second.

A colored layer (LEXAN SD8B24 manufactured by SABIC) having a thickness of 400 μm, a back surface lamination layer (LEXAN SD8B14 manufactured by SABIC) having a thickness of 200 and a front surface lamination layer (LEXAN SD8B14 manufactured by SABIC) having a thickness of 100 μm were used. A black ink was applied to the front surface of the colored layer to form a printed part.

Next, the back surface lamination layer, the colored layer, the recording layer and the front surface lamination layer were laminated in this order with the optical security patch being sandwiched between the recording layer and the front surface lamination layer. Then, these layers were thermally pressed for lamination and formed into a card shape to obtain a laminate containing an optical security patch inside. Temperature, pressure and time for the lamination were respectively set to 200° C., 80 N/cm² and 25 minutes.

A laser beam was applied to the recording layer of the laminate from a front surface lamination layer side by using a fiber laser irradiation device which outputted a laser beam having a wavelength of 1,064 nm. Thus, a recording region was formed on the inside of the recording layer, thereby obtaining an individual certificate medium of Example 1.

When the individual certificate medium of Example 1 was observed in the thickness direction, it was confirmed that the recording region formed at a portion overlapping with the optical security patch was not observable in the recording layer. In contrast, when the individual certificate medium of Example 1 was observed in a direction intersecting the thickness direction thereof, diffracted light emerging from the optical security patch was observed. Accordingly, it was confirmed that the recording region was observable due to contrast between the diffracted light and the recording region. When the optical security patch was removed from the individual certificate medium of Example, it was confirmed that the recording region was observable, irrespective of the direction of observing the individual certificate medium.

Example 2

An individual certificate medium of Example 2 was obtained as in Example 1 except that the material used for forming the metal layer was changed from aluminum to nickel. It was confirmed that advantageous effects equivalent to those of the individual certificate medium of Example 1 were also achieved in the individual certificate medium of Example 2.

As described above, according to the first embodiment of the information recording medium and the individual certificate medium, the advantageous effects enumerated below can be achieved.

(1) When the direction of observing the individual certificate medium 10 is changed, the image presented by the individual certificate medium 10 can be changed. Thus, visual effects of the individual certificate medium 10 can be enhanced.

(2) The color of the metal layer 22 is likely to be recognized by the observer OB as being substantially the same as the color of the recording region 12a. Therefore, when the individual certificate medium 10 is observed in the thickness direction of the recording layer 12, the observer OB may have more difficulty in observing the recording region 12a.

(3) The observer OB of the individual certificate medium 10 is unlikely to notice the presence of the recording region 12a. Therefore, if the second image PIC2 is falsified in the individual certificate medium 10, the recording region 12a has a high probability of not being falsified. Thus, falsification of the individual certificate medium 10 can be found based on a difference between the information in the second image PIC2 and the information in the recording region 12a.

The first embodiment described above may be implemented with appropriate modifications as follows.

Figure 14:
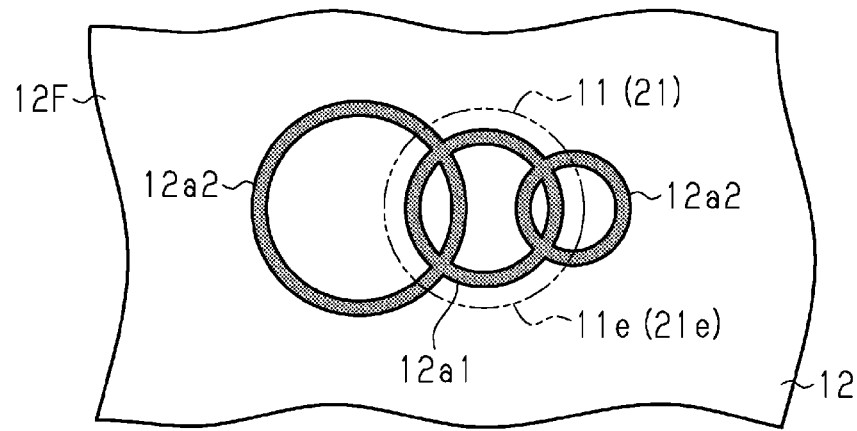
FIG. 14 is a partial plan view illustrating a structure of a recording layer, according to a modification of an individual certificate medium.
Figure 15:
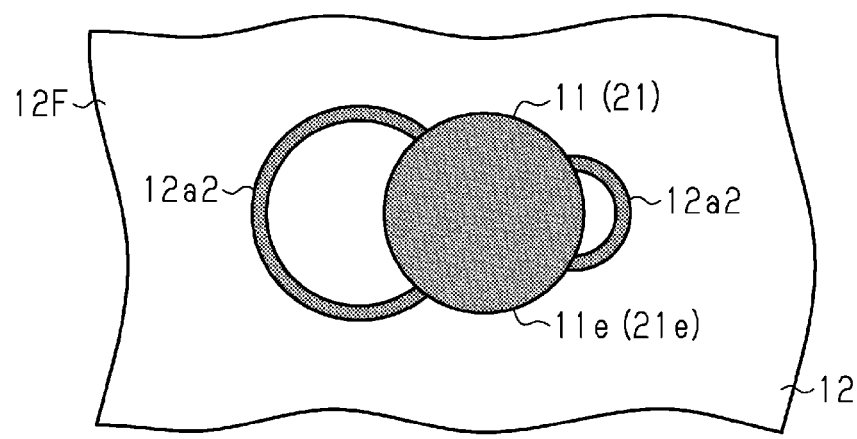
FIG. 15 is a diagram explaining effects of an individual certificate medium, according to a modification of an individual certificate medium.
Figure 16:
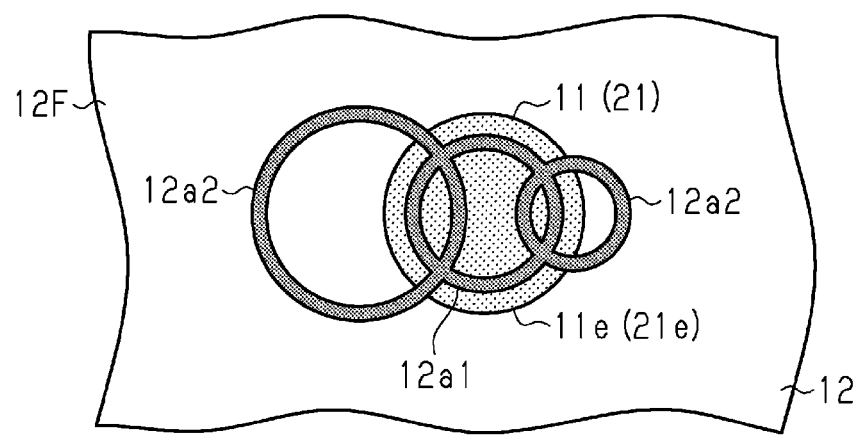
FIG. 16 is a diagram explaining effects of an individual certificate medium, according to a modification of an individual certificate medium.

The individual certificate medium 10 may have the configuration described referring to FIGS. 14 to 16.

Specifically, as shown in FIG. 14, the recording layer 12 may include an inner recording region 12a1 and an outer recording region 12a2. The inner and outer recording regions 12a1 and 12a2 are regions formed by applying a laser beam LB to the recording layer 12. As viewed the thickness direction of the recording layer 12, the inner recording region 12a1 is disposed on a perimeter 21e of the relief layer 21 or, in other words, on and inside a perimeter 11e of the optical security patch 11. The outer recording region 12a2 is disposed outside the perimeter 11e of the optical security patch 11. As shown in FIG. 14, the outer and inner recording regions 12a2 and 12a1 may be connected via the perimeter 11e of the optical security patch 11.

Each of the inner and outer recording regions 12a1 and 12a2 of FIG. 14 is a part of a complete image formed by three rings connected to each other in plan view perpendicular to the front surface 12F of the recording layer 12. The inner and outer recording regions 12a1 and 12a2, as long as they form a complete image crossing over the perimeter 11e of the optical security patch 11, may have a geometric configuration as mentioned above or may form any of characters, numerals and motifs.

As shown in FIG. 15, when the individual certificate medium 10 is observed in the thickness direction of the recording layer 12, the observer observes the outer recording region 12a2 disposed outside the perimeter 11e of the optical security patch 11, while not observing the inner recording region 12a1 disposed on and inside the perimeter 11e of the optical security patch 11.

However, as shown in FIG. 16, when the individual certificate medium 10 is observed in a direction intersecting the thickness direction of the recording layer 12, the observer observes a complete image formed by the inner and outer recording regions 12a1 and 12a2 together with the diffracted light emerging from the optical security patch 11.

According to the configuration described above, the advantageous effects as set forth below can be achieved.

(4) When the individual certificate medium 10 is observed in the thickness direction of the recording layer 12, the observer observes only the image formed by the outer recording region 12a2. However, when the individual certificate medium 10 is observed in a direction intersecting the thickness direction of the recording layer 12, the observer observes an image formed by the inner recording region 12a1 being connected to the outer recording region 12a2 at portions thereof. Thus, with the change in direction of observing the individual certificate medium 10, the image shown by the individual certificate medium 10 can be changed. Furthermore, visual effects of the individual certificate medium 10 can be enhanced.

The outer recording region 12a2 does not have to be a region formed by applying a laser beam to the recording layer 12. The outer recording region 12a2 may be a region formed by printing on the front surface 12F of the recording layer 12. The outer recording region 12a2 may be a region formed by fusion heat transfer or sublimation heat transfer on the front surface 12F of the recording layer 12.

The information in the recording region 12a, which is an example of the inner recording region, is not limited to the personal information mentioned above but may be any information other than personal information. With this configuration, the information in the recording region 12a may be configured by at least characters, numerals, diagrams or motifs.

The color of the recording region 12a is not limited to black as mentioned above but may be gray having higher lightness than black and having a chroma level equal to black. As described above, as viewed in the thickness direction of the recording layer 12, the optical security patch 11 can form a gray image and thus can hide the recording region 12a.

As long as the metal layer 22 overlaps with the entirety of the recording region 12a and covers a plurality of convexities 21a in a region extending beyond the recording region 12a, the metal layer 22 does not necessarily have to cover all the convexities 21a but may cover only a part of them. If the metal layer 22 covers only a part of the plurality of convexities 21a, a higher processing technique is involved in forming such a metal layer 22, compared to forming a metal layer 22 covering the entirety of the plurality of convexities 21a. However, more intricate visual effects can be achieved in the individual certificate medium 10. Thus, the effect of preventing falsification of the individual certificate medium 10 can be further enhanced.

The metal layer 22 covering only a part of the plurality of convexities 21a can be formed by the following method. First, a metal layer covering the entirety of the plurality of convexities 21a is formed. Then, a covering layer having a predetermined pattern is formed on a part of the metal layer. The covering layer may be formed by printing, coating or deposition. Then, the metal layer is selectively removed according to the pattern of the covering layer to form a metal layer 22 covering only a part of the plurality of convexities 21a.

The material applied to formation of the covering layer may be a resin having higher solubility or lower solubility when exposed to ultraviolet light. Such a resin material is applied onto the metal layer and exposed to ultraviolet light according to the pattern, followed by developing the covering layer. Thus, the covering layer formed in this way will have a pattern similar to or inverted from the exposure pattern of ultraviolet light. Alternatively, a soluble resin may be applied to a part of a metal layer and then a covering layer covering the entirety of the metal layer may be formed. Then, the resin and a part of the covering layer formed on the resin may be removed from the metal layer by a solvent for dissolving the resin. Thus, a patterned covering layer can be formed. Alternatively, the covering layer may include a first area and a second area. In this case, permeability of the etchant used in the first area may be made different from that of the etchant used in the second area. Such a covering layer may enable selective etching of the metal layer due to the difference in permeability of the etchants used for the covering layer.

Applications of the information recording medium are not limited to the individual certificate medium 10 described above. The information recording medium may be applied to information recording media used for games, various tickets, decorating items, or objects of appreciation.

Second Embodiment

Figure 17:
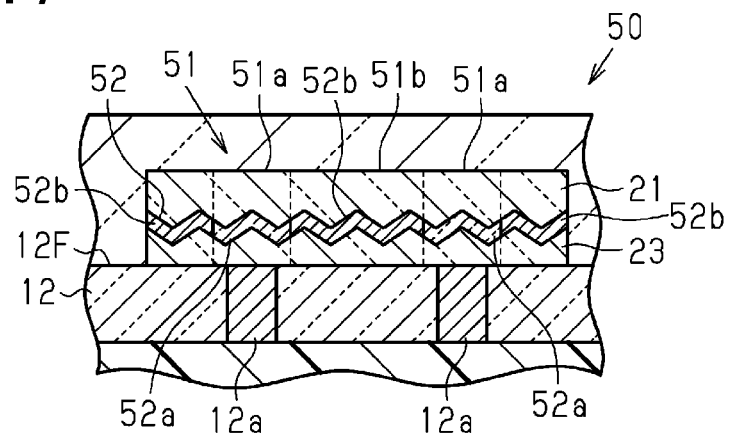
FIG. 17 is a partial cross-sectional view illustrating a structure of an individual certificate medium, according to a second embodiment of an information recording medium and an individual certificate medium.
Figure 18:
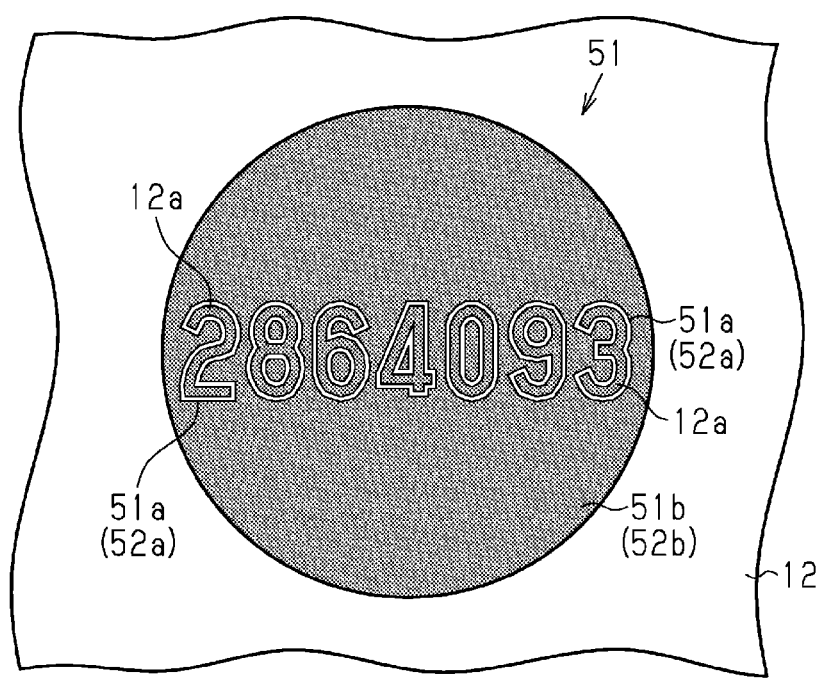
FIG. 18 is a partial plan view illustrating a structure of an individual certificate medium as viewed in the thickness direction of a recording layer.

Referring to FIGS. 17 and 18, a second embodiment of the information recording medium and the individual certificate medium according to the present invention will be described. The second embodiment is different from the first embodiment in the configuration of the metal layer. The second embodiment will be described focusing on such differences, omitting specific explanation of components common to the first embodiment by designating the same reference signs thereto as those of the first embodiment. In the following description, configuration and advantageous effects of the individual certificate medium will be sequentially explained.

[Configuration of Individual Certificate Medium]

Referring to FIG. 17, a configuration of the individual certificate medium will be described. FIG. 17 is an enlarged cross-sectional view of a part of the individual certificate medium including an optical security patch.

As shown in FIG. 17, an individual certificate medium 50 includes a recording layer 12 and an optical security patch 51 as in the individual certificate medium 10 of the first embodiment. The recording layer 12 has a front surface 12F on a part of which the optical security patch 51 is disposed. The optical security patch 51 includes a relief layer 21, a metal layer 52 and an adhesive layer 23.

The metal layer 52 includes an altered region 52a and a non-altered region 52b. The altered region 52a includes a region that is aligned with the recording region 12a as viewed in the thickness direction of the recording layer 12 and surrounds the entirety of the perimeter of the aligned region. In other words, the altered region 52a has a size overlapping and covering the entirety of the recording region 12a and extending beyond the perimeter of the region overlapping with the recording region 12a in plan view perpendicular to the front surface 12F of the recording layer 12. Thus, the altered region 52a is optically transparent to the recording region 12a having a specific color and is also optically transparent to the portion surrounding the recording region 12a, in the recording layer 12 serving as an underlayer.

The optical security patch 51 includes the altered region 52a, a first area 51a, the non-altered region 52b and a second area 51b. The first area 51a is a part of the relief layer 21 and is aligned with the altered region 52a as viewed in the thickness direction of the recording layer 12. The second area 51b is a part of the relief layer 21 and is aligned with the non-altered region 52b as viewed in the thickness direction of the recording layer 12.

As described above, when the laser beam LB is applied to the recording layer 12 and the metal layer 52 and when the energy provided to these layers exceeds a predetermined amount, the portion where the metal layer 52 has been altered will have an area that is larger than the area of the portion where the recording layer 12 has been carbonized, as viewed in the thickness direction of the recording layer 12. Thus, the altered region 52a and the recording region 12a can be formed by increasing the amount of energy of the laser beam applied to the recording layer 12 via the metal layer 52 to not less than a predetermined amount.

[Advantageous Effects of Individual Certificate Medium]

Referring to FIG. 18, advantageous effects of the individual certificate medium 50 will be described. FIG. 18 shows a state of the optical security patch 51 when the individual certificate medium 50 is observed in the thickness direction of the recording layer 12.

As shown in FIG. 18, when the individual certificate medium 50 is observed in the thickness direction of the recording layer 12, among the light incident on the entirety of the optical security patch 51, the light incident on the second area 51b is absorbed therein. Therefore, the second area 51b is observed to be a black portion by the observer, and the portion of the recording layer 12 under the second area 51b is not observed by the observer.

In contrast, among the light incident on the entirety of the optical security patch 51, the light incident on the first area 51a is transmitted therethrough. Therefore, the portion of the recording layer 12 under the first area 51a is observed via the first area 51a by the observer. Accordingly, the recording region 12a and the portion surrounding the recording region 12a in plan view perpendicular to the front surface 12F of the recording layer 12 are observed by the observer. Consequently, the observer observes an image, in which the portion surrounding the recording region 12a frames the recording region 12a, via the altered region 52a.

As described above, according to the second embodiment of the information recording medium and the individual certificate medium, the advantageous effects described below can be achieved.

(5) When the individual certificate medium 50 is observed in the thickness direction of the recording layer 12, the observer observes an image, in which the portion surrounding the recording region 12a frames the recording region 12a, via the altered region 52a. In contrast, when the individual certificate medium 50 is observed in a direction intersecting the thickness direction of the recording layer 12, the observer observes an image in which an image formed by the recording region 12a and the portion surrounding the recording region 12a is framed by an image formed by diffracted light.

The second embodiment described above may be appropriately modified and implemented as follows.

The individual certificate medium 50 can be implemented by combining the configurations of the individual certificate media 10 of the second and third examples described in the first embodiment. Specifically, the optical security patch 51 may be disposed only between the colored layer 14 and the recording layer 12, or may be disposed between the recording layer 12 and the front surface lamination layer 15 and between the colored layer 14 and the recording layer 12.

Third Embodiment

Figure 19:
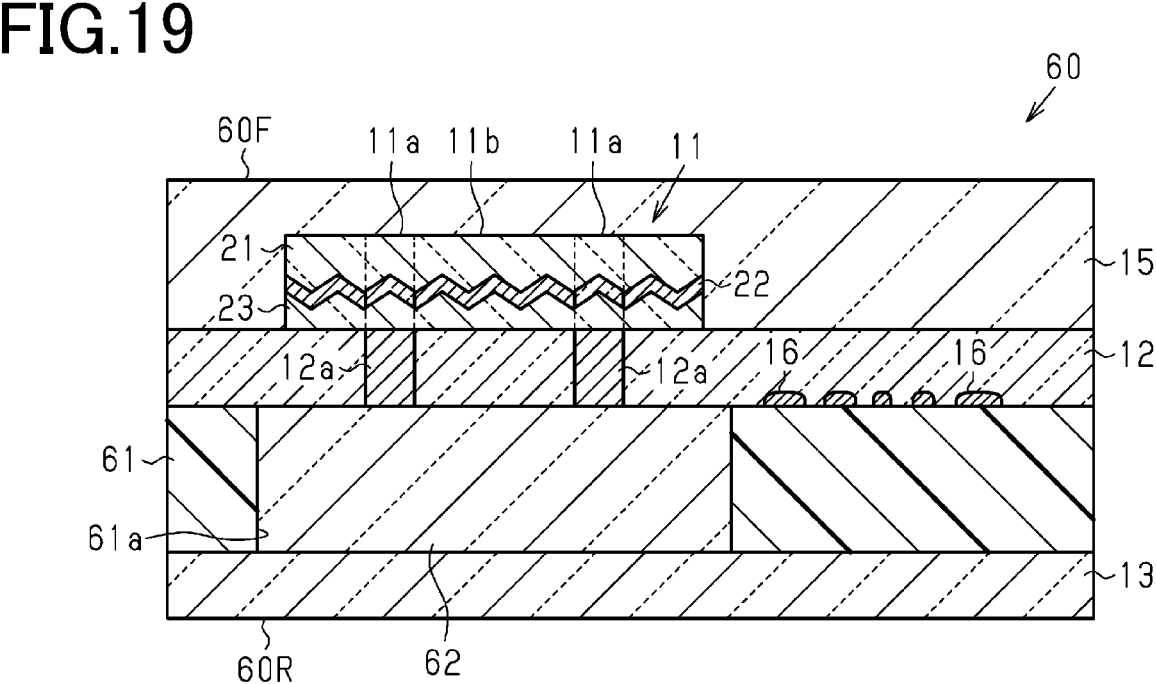
FIG. 19 is a cross-sectional view illustrating a structure of an individual certificate medium, according to a third embodiment of an individual certificate medium.

Referring to FIG. 19, a third embodiment of the information recording medium and the individual certificate medium according to the present invention will be described. The third embodiment is different from the first embodiment in the configuration of the colored layer. The third embodiment will be described focusing on such differences, omitting specific explanation of the components common to the first embodiment by designating the same reference signs thereto as those of the first embodiment.

As shown in FIG. 19, in an individual certificate medium 60, a back surface lamination layer 13, a colored layer 61, a recording layer 12 and a front surface lamination layer 15 are laminated in this order, and an optical security patch 11 is disposed between the recording layer 12 and the front surface lamination layer 15. As viewed in the thickness direction of the recording layer 12, the colored layer 61 overlaps with the optical security patch 11, extends beyond the optical security patch 11 and has a color. As viewed in the thickness direction of the recording layer 12, the colored layer 61 includes a through hole 61a which overlaps with the entirety of the optical security patch 11 and occupies a space extending beyond the optical security patch 11 throughout the circumference of the optical security patch 11.

The through hole 61a includes a filling member 62 filling the through hole 61a. The material used for forming the filling member 62 may be, for instance, a resin. The filling member 62 has optical transparency similarly to the recording layer 12, the front surface lamination layer 15 and the back surface lamination layer 13. The filling member 62 may have a color different from that of the colored layer 61. The through hole 61a does not have to include the filling member 62.

With the filling member 62 being disposed in the through hole 61a, at least either of a front surface 60F and a back surface 60R of the individual certificate medium 60 is prevented from being recessed at a region overlapping with the through hole 61a.

As described above, according to the third embodiment of the information recording medium and the individual certificate medium, the advantageous effects described below can be achieved.

(6) As viewed in the thickness direction of the recording layer 12, the region where the colored layer 61 is disposed in the region on the outside of the optical security patch 11 is observed as a region having the color of the colored layer 61, and the region where the colored layer 61 is not disposed is observed as a region not having the color of the colored layer 61. Thus, the visual effects of the individual certificate medium 60 can be further enhanced.

The third embodiment described above may be implemented by being appropriately modified as follows.

As viewed in the thickness direction of the recording layer 12, the through hole 61a may overlap with only a part of the optical security patch 11. In this case, the through hole 61a may occupy a space extending beyond the optical security patch 11 in a part of the circumference of the optical security patch 11. With this configuration as well, as viewed in the thickness direction of the recording layer 12, the region where the colored layer 61 is not disposed in the region on the outside of the optical security patch 11 is observed as a region not having the color of the colored layer 61. Thus, an advantageous effect similar to that mentioned in the above item (6) can be achieved.

The individual certificate medium 60 can be implemented by combining the configurations of the individual certificate media 10 of the second and third examples of the first embodiment. Specifically, the optical security patch 11 of the individual certificate medium 60 may be disposed in the through hole 61a of the colored layer 61. Alternatively, the individual certificate medium 60 may include a first optical security patch 11A and a second optical security patch 11B, with the former being disposed between the front surface lamination layer 15 and the recording layer 12, and with the latter being disposed in the through hole 61a of the colored layer 61. In either case, the filling member 62 may be or may not be disposed in the through hole 61a.

The individual certificate medium 60 may be implemented in combination with the configuration of the individual certificate medium 50 of the second embodiment. Specifically, the optical security patch 11 of the individual certificate medium 60 may be the optical security patch 51 of the individual certificate medium 50 of the second embodiment.

Fourth Embodiment

Figure 20:
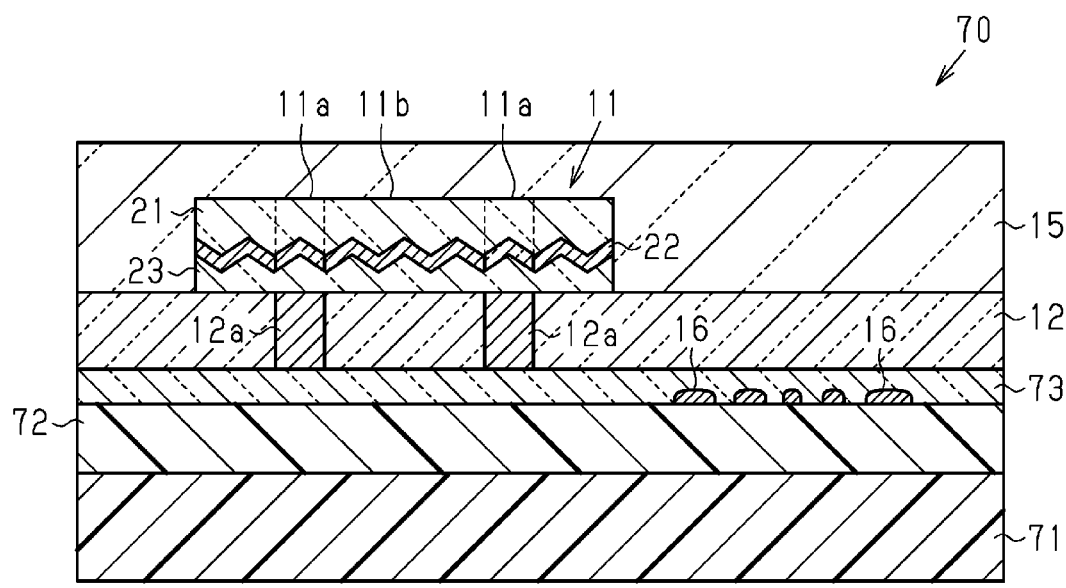
FIG. 20 is a cross-sectional view illustrating a structure of an individual certificate medium, according to a fourth embodiment of an individual certificate medium.

Referring to FIG. 20, a fourth embodiment of the information recording medium and the individual certificate medium will be described. The fourth embodiment is different from the first embodiment in the configuration of the back surface-side carrier film. The fourth embodiment will be described focusing on such differences, omitting specific explanation of the components common to the first embodiment by designating the same reference signs thereto as those of the first embodiment. In the following description, configuration and components of the individual certificate medium will be explained.

[Configuration of Individual Certificate Medium]

Referring to FIG. 20, a configuration of the individual certificate medium will be described.

As shown in FIG. 20, an individual certificate medium 70 includes a first adhesive layer 71, a labelling base material 72 and a second adhesive layer 73, in addition to an optical security patch 11, a front surface lamination layer 15 and a recording layer 12. In the individual certificate medium 70, the first adhesive layer 71, the labelling base material 72, the second adhesive layer 73, the recording layer 12 and the front surface lamination layer 15 are laminated in this order, with a printing portion 16 being disposed between the labelling base material 72 and the second adhesive layer 73.

Thus, the individual certificate medium 70 includes the labelling base material 72 and the first adhesive layer 71. The labelling base material 72, which is an example of the flexible carrier film, supports the front surface lamination layer 15 and the recording layer 12. The first adhesive layer 71 is disposed on a surface of the labelling base material 72 opposite to the front surface lamination layer 15 and the recording layer 12. With this configuration, the individual certificate medium 70 is imparted with flexibility enhancing conformability to the shape of an object to which the individual certificate medium 70 is affixed.

The second adhesive layer 73 has optical transparency. The labelling base material 72 and the first adhesive layer 71 may or may not have optical transparency.

[Materials for Forming Components]

Materials for forming the individual certificate medium 70 will be described. The following description explains materials for forming the components of the individual certificate medium 70, which are different from those of the individual certificate medium 10 of the first embodiment.

[First Adhesive Layer]

The material used for the adhesive layer 23 described above can be applied to the first adhesive layer 71. The first adhesive layer 71 may have a thickness of 1 μm or more and 300 μm or less. The first adhesive layer 71 may have a thickness of 5 μm or more and 100 μm or less.

[Labelling Base Material]

The labelling base material 72 may be a plastic film or paper. The plastic film or paper used for the labelling base material 72 may have rigidity lower than that of the plastic sheet used for the colored layer 14 described above. The plastic film may be a PET film, a PEN film or a PP film. The paper used for the labelling base material 72 may be synthetic paper, plastic multiple-layer paper, resin-impregnated paper, paper board, corrugated board, metal-deposited paper or heat-transfer paper. The material for the plastic film or the paper may be a material which is unlikely to deform or alter the labelling base material 72 due to heat or pressure applied to the labelling base material 72 when a printed part 16 is formed thereon or due to the solvent brought into contact with the labelling base material 72.

The labelling base material 72 may have a thickness of 40 µm or more and 200 µm or less. The labelling base material 72 may have a thickness of 50 µm or more and 120 µm or less. When the labelling base material 72 has a thickness of 40 µm or more, the physical strength of the labelling base material 72 is enhanced, balanced with ease of handling. When the labelling base material 72 has a thickness of 200 µm or less, flexibility can be imparted to the labelling base material 72, or further, to the individual certificate medium 70 including the labelling base material 72.

[Second Adhesive Layer]

The material used for the adhesive layer 23 described above can be applied to the second adhesive layer 73. The second adhesive layer 73 may have a thickness of 0.1 µm or more and 10 µm or less. The second adhesive layer 73 may have a thickness of 1 µm or more and 5 µm or less.

As described above, according to the fourth embodiment of the information recording medium and the individual certificate medium, the advantageous effects described below can be achieved.

(7) Flexibility imparted to the individual certificate medium 70 can enhance conformability of the individual certificate medium 70 to the shape of an object to which the individual certificate medium 70 is affixed.

The fourth embodiment described above may be appropriately modified and implemented as follows.

The individual certificate medium 70 can be implemented by combining the configurations of the individual certificate media 10 of the second and third examples described in the first embodiment. Specifically, the optical security patch 11 may be disposed only between the recording layer 12 and the second adhesive layer 73, or may be disposed between the recording layer 12 and the front surface lamination layer 15 and between the second adhesive layer 73 and the recording layer 12.

The individual certificate medium 70 may be implemented in combination with the configuration of the individual certificate medium 50 of the second embodiment. Specifically, the optical security patch 11 of the individual certificate medium 70 may be the optical security patch 51 of the individual certificate medium 50 of the second embodiment.

The first to fourth embodiments described above may be combined with each other.

Technical idea derived from the above embodiments and modifications will be additionally stated below.

[Statement 1]

An information recording medium including:

a recording layer including a recording region which is enclosed by a region characteristic of being carbonized by application of a laser beam and having optical transparency to indicate predetermined information by being carbonized by application of the laser beam; and a metal layer overlapping with the entirety of the recording region in a thickness direction of the recording layer and extending beyond the recording region, the metal layer containing metal as a main component, the metal layer including an altered region overlapping with the entirety of the recording region in the thickness direction, surrounding the entirety of a perimeter of the region overlapping with the recording region in the thickness direction and having optical transparency, and a non-altered region that is a portion other than the altered region.

According to the configuration described above, when the information recording medium is observed in the thickness direction, the observer observes an image, in which the portion surrounding the recording region frames the recording region, via the altered region.

What is claimed is:

1. An information recording medium, comprising:
    a recording layer that includes a non-recording region carbonizable by application of a laser beam, and a recording region enclosed by the non-recording region and presenting predetermined information by being carbonized by application of the laser beam;
    a relief layer that includes a plurality of two-dimensionally arrayed convexities in a region which overlaps with the entirety of the recording region and occupies a region larger than the recording region as viewed in a thickness direction of the recording layer, the convexities being arrayed at a pitch of 190 nm or more and 580 nm or less and having optical transparency, the convexities are directed towards the recording layer; and
    a metal layer that overlaps with the entirety of the recording region and covers the plurality of convexities in the region as viewed in the thickness direction, the metal layer mainly containing metal, the metal layer including an altered region overlapping with the entirety of the recording region as viewed in the thickness direction and having optical transparency, and a non-altered region that is a portion other than the altered region, wherein
    the relief layer and the metal layer configure an optical security patch that includes a first area and a second area, the first area including the altered region and a portion of the relief layer, the portion being aligned with the altered region as viewed in the thickness direction, the second area including the non-altered region and another portion of the relief layer, the portion being aligned with the non-altered region as viewed in the thickness direction; and,
    the first area transmits light incident on the first area and the second area absorbs light incident on the second area to hide the recording region as viewed in the thickness direction, and the first area and the second area cause light incident on the optical security patch to emerge as diffracted light in a direction intersecting the thickness direction.

2. The information recording medium of claim 1, wherein the altered region surrounds the entirety of a perimeter of a region overlapping with the recording region as viewed in the thickness direction.

3. The information recording medium of claim 1, wherein
    the information recording medium further comprises a colored layer overlapping with the optical security patch and extending beyond the optical security patch as viewed in the thickness direction, and having a predetermined color; and
    the colored layer includes a through hole which overlaps with the optical security patch and occupies a space extending beyond the optical security patch as viewed in the thickness direction.

4. The information recording medium of claim 1, wherein
    the plurality of convexities are two-dimensionally disposed over the entirety of the relief layer as viewed in the thickness direction;

the metal layer covers all the convexities as viewed in the thickness direction;

the recording region is an inner recording region, which is defined by a perimeter of the relief layer when viewed in the thickness direction, the inner recording region is a portion of the recording layer disposed inside the perimeter as viewed in the thickness direction; and the information recording medium further comprises an outer recording region that is disposed outside the perimeter of the relief layer and connected to the inner recording region as viewed in the thickness direction.

5. The information recording medium of claim 1, wherein the metal layer principally contains any one selected from the group consisting of aluminum, nickel and iron; and the recording region is black.

6. An individual certificate medium comprising the information recording medium of claim 1, wherein the information recording medium presents personal information belonging to a particular individual.

7. A transfer foil comprising:

a carrier film that supports the information recording medium of claim 1 and has flexibility; and an adhesive layer that is provided to a surface of the information recording medium opposite to the carrier film.

8. An individual certificate medium comprising the information recording medium according to claim 1, wherein the information recording medium presents personal information belonging to a particular individual;

the recording region is an inner recording region that presents the personal information as the information of the recording region; and the individual certificate medium further comprises an outer recording region disposed outside the perimeter of the relief layer as viewed in the thickness direction, the outer recording region presents the same personal information as the personal information in the inner recording region.

\* \* \* \* \*